(12) United States Patent
Jung et al.

(10) Patent No.: US 11,234,100 B2
(45) Date of Patent: Jan. 25, 2022

(54) ELECTRONIC DEVICE FOR PERFORMING RANGING OPERATION AND OPERATION METHOD THEREOF

(71) Applicant: Samsung Electronics Co., Ltd., Suwon-si (KR)

(72) Inventors: Buseop Jung, Suwon-si (KR); Soonho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/838,493

(22) Filed: Apr. 2, 2020

(65) Prior Publication Data
US 2020/0367016 A1     Nov. 19, 2020

(30) Foreign Application Priority Data
May 13, 2019 (KR) .................. 10-2019-0055734

(51) Int. Cl.
*H04W 4/00* (2018.01)
*H04W 4/02* (2018.01)
(Continued)

(52) U.S. Cl.
CPC .......... *H04W 4/023* (2013.01); *H04W 8/005* (2013.01); *H04W 72/12* (2013.01)

(58) Field of Classification Search
CPC ......... H04Q 4/023; H04Q 8/005; H04Q 72/12
See application file for complete search history.

(56) References Cited

U.S. PATENT DOCUMENTS 9,571,973 B1 * 2/2017 Alanen ................. H04W 48/16
2014/0254569 A1    9/2014 Abraham et al.
(Continued)

FOREIGN PATENT DOCUMENTS

KR    10-2019-0029669 A    3/2019
WO      2017/030415 A1    2/2017

OTHER PUBLICATIONS

International Search Report dated Jul. 6, 2020, issued in International Application No. PCT/KR2020/004516.

*Primary Examiner* — Erika A Washington
(74) *Attorney, Agent, or Firm* — Jefferson IP Law, LLP

(57) ABSTRACT

An electronic device is provided. The electronic device includes a communication module, a processor, and at least one memory, wherein the at least one memory may store instructions which instruct, when executed, the processor to, identify a plurality of external electronic devices satisfying a condition for performing a ranging operation, during a first period of time, transmit a first message, including identification information of the plurality of external electronic devices and schedule information regarding a second period of time different from the first period of time, to the plurality of external electronic devices through the communication module, based on obtaining a response corresponding to the first message from the plurality of external electronic devices, perform a ranging preparation operation with at least one external electronic device among the plurality of external electronic devices during the second period of time, and perform, based on the ranging preparation operation, a ranging operation with the at least one external electronic device. Various other embodiments are possible.

19 Claims, 13 Drawing Sheets

(51) Int. Cl.
*H04W 72/12* (2009.01)
*H04W 8/00* (2009.01)

(56) References Cited

U.S. PATENT DOCUMENTS

| | | |
|---|---|---|
| 2015/0350906 A1 | 12/2015 | Patil et al. |
| 2016/0242056 A1 | 8/2016 | Patil et al. |
| 2017/0041926 A1* | 2/2017 | Qi .......................... G01S 13/74 |
| 2017/0215131 A1* | 7/2017 | Qi .......................... H04W 76/14 |
| 2018/0098231 A1 | 4/2018 | Qi et al. |
| 2019/0208387 A1* | 7/2019 | Jiang ................... H04W 72/044 |
| 2019/0239182 A1 | 8/2019 | Rune et al. |
| 2019/0274130 A1* | 9/2019 | Cheng ............... H04W 72/0406 |
| 2019/0285736 A1* | 9/2019 | Ni ...................... G01S 7/52004 |

\* cited by examiner

ELECTRONIC DEVICE FOR PERFORMING RANGING OPERATION AND OPERATION METHOD THEREOF

CROSS-REFERENCE TO RELATED APPLICATION(S)

This application is based on and claims priority under 35 U.S.C. § 119(a) of a Korean patent application number 10-2019-0055734, filed on May 13, 2019, in the Korean Intellectual Property Office, the disclosure of which is incorporated by reference herein in its entirety.

BACKGROUND

1. Field

The disclosure relates to a device and a method for performing a ranging operation by an electronic device supporting a neighbor awareness networking (NAN) in a wireless communication system.

2. Description of the Related Art

Wireless communication systems have been developed to provide various types of communication services, such as a voice service or a data service. In general, a wireless communication system is a multiple access system which can share available system resources (bandwidth or transmission power) to support communication with multiple users. Examples of a multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Further, recently, with the development of information communication technology, various wireless communication technologies have been developed. Among these technologies, wireless LAN (WLAN) is a technology, based on wireless frequency technologies, allowing a user to use a portable terminal, such as a personal digital assistant (PDA), a laptop computer, or a portable multimedia player (PMP), so as to wirelessly access the Internet at home, a company, or a particular service providing area. In a Wi-Fi standard among the wireless frequency technologies a low-power discovery technology, called "neighbor awareness networking (NAN)", has been developed and development is progressing on a proximity service using the same.

The above information is presented as background information only to assist with an understanding of the disclosure. No determination has been made, and no assertion is made, as to whether any of the above might be applicable as prior art with regard to the disclosure.

SUMMARY

Between a plurality of electronic devices constituting a neighbor awareness networking (NAN) cluster, an electronic device may perform a ranging preparation operation with another electronic device during one discovery window (DW) interval, and may perform a ranging preparation operation with the another electronic device during a low-power state interval subsequent to the discovery window interval. Thus, in order for an electronic device to perform ranging preparation operations with a plurality of external electronic devices, there is a need for discovery window intervals corresponding to the number of the plurality of external electronic devices and much time may be consumed on completing the entire ranging preparation operation.

Aspects of the disclosure are to address at least the above-mentioned problems and/or disadvantages and to provide at least the advantages described below. Accordingly, an aspect of the disclosure is to provide an electronic device or an operation method thereof, wherein the electronic device is capable of performing a prior operation (e.g. a ranging preparation operation) required for a ranging operation with a plurality of external electronic devices for performing a ranging preparation operation during one discovery window interval, and is capable of performing the ranging operation with the plurality of external electronic devices during a low-power state interval subsequent to the discovery window interval.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuitry, a processor, and at least one memory, wherein the at least one memory may store instructions which instruct, when executed, the processor to, identify a plurality of external electronic devices satisfying a condition for performing a ranging operation, during a first period of time, transmit a first message, including identification information of the plurality of external electronic devices and schedule information regarding a second period of time different from the first period of time, to the plurality of external electronic devices through the communication circuitry, based on obtaining a response corresponding to the first message from the plurality of external electronic devices, perform a ranging preparation operation with at least one external electronic device among the plurality of external electronic devices during the second period of time; and perform, based on the ranging preparation operation, a ranging operation with the at least one external electronic device.

In accordance with another aspect of the disclosure, a method for performing a ranging operation is provided. The method includes identifying a plurality of external electronic devices satisfying a condition for performing a ranging operation, during a first period of time, transmitting a first message, including identification information of the plurality of external electronic devices and schedule information regarding a second period of time different from the first period of time, to the plurality of external electronic devices through a communication circuitry, based on obtaining a response corresponding to the first message from the plurality of external electronic devices, performing a ranging preparation operation with at least one external electronic device among the plurality of external electronic devices during the second period of time, and performing, based on the ranging preparation operation, a ranging operation with the at least one external electronic device.

In accordance with various embodiments, an electronic device can perform a ranging operation with a plurality of external electronic devices in one low-power state interval, and thus can perform the ranging operation with the plurality of external electronic devices at a rapid rate without delaying searches.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
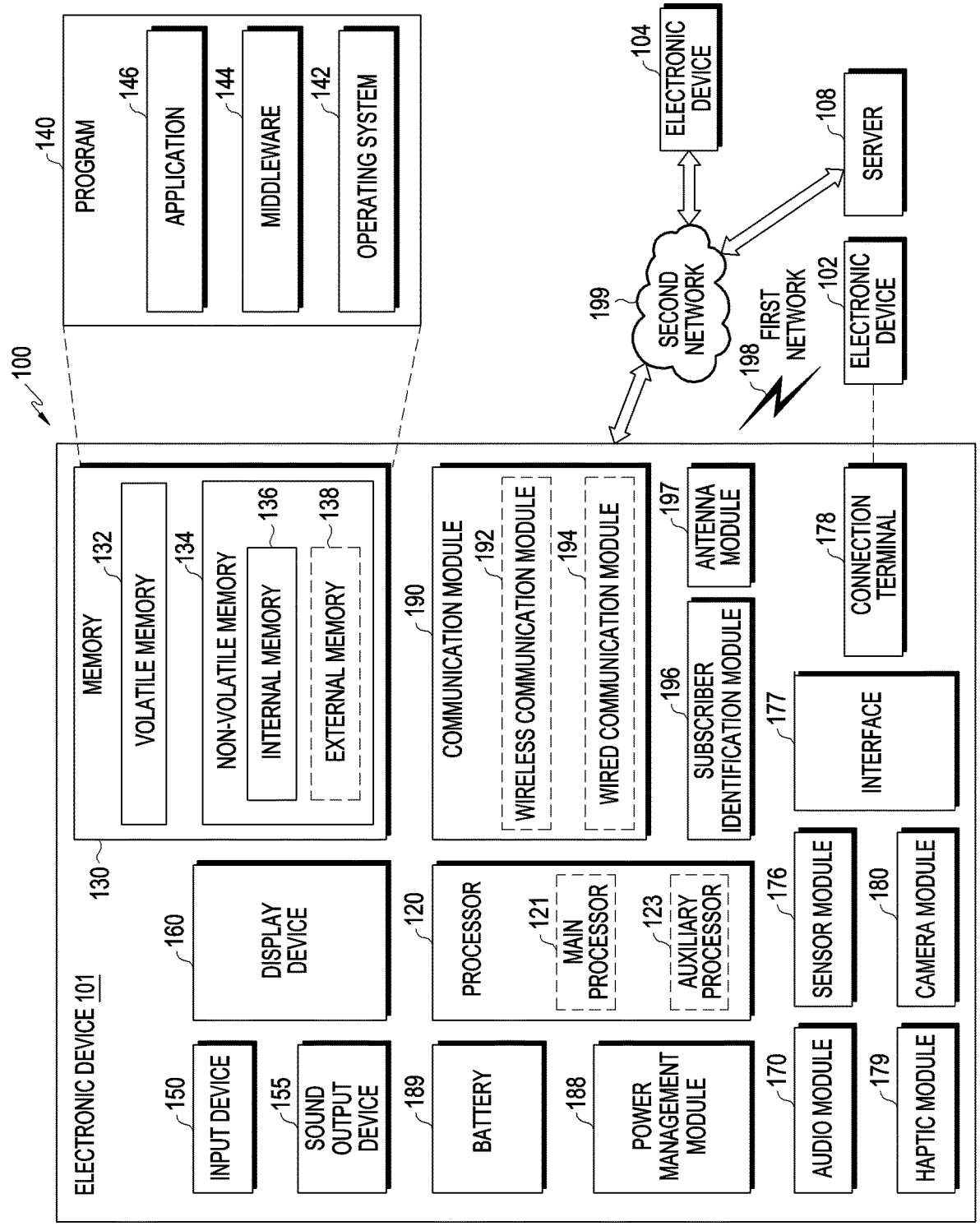
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for receiving an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
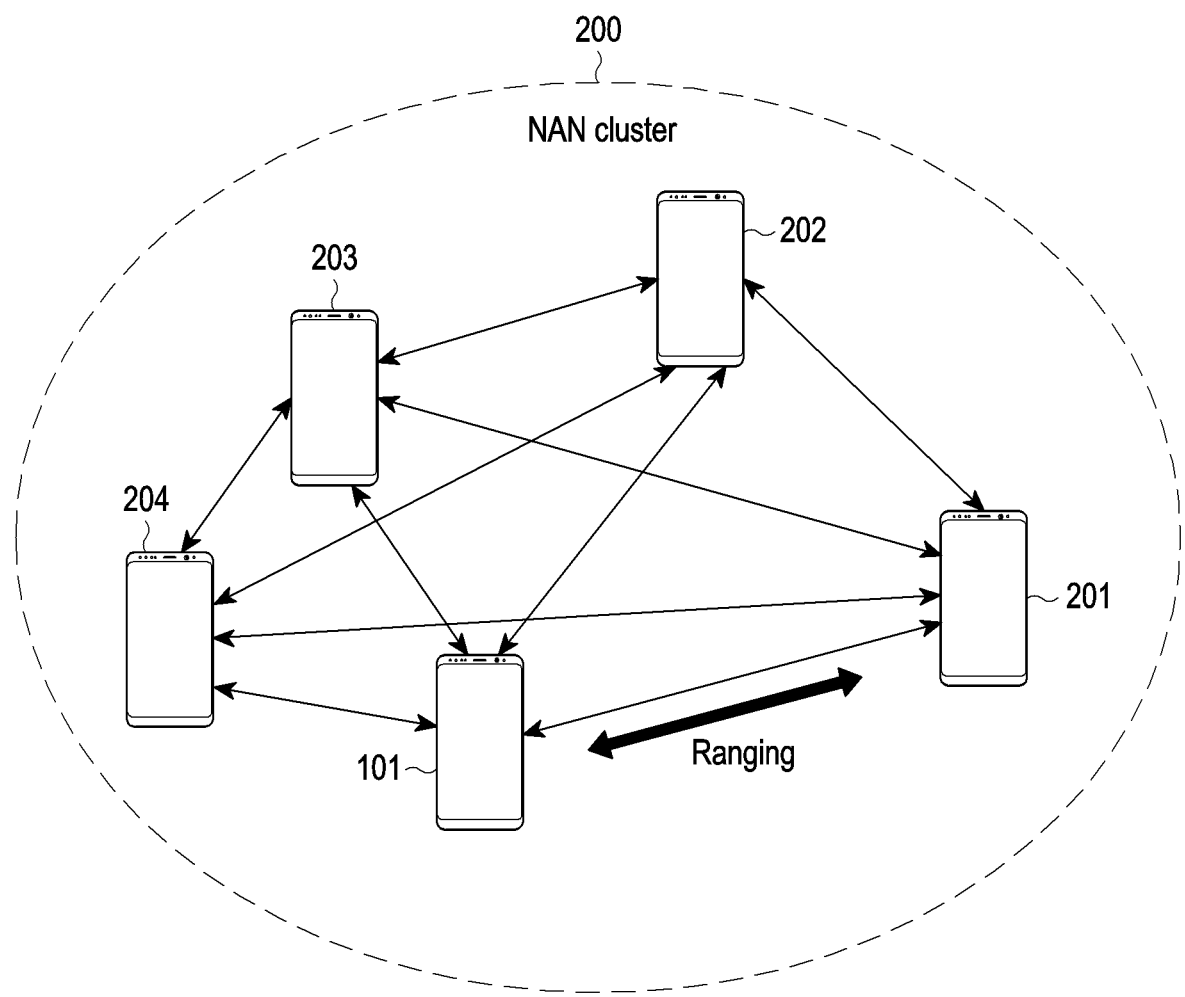
FIG. 2 illustrates a neighbor awareness networking (NAN) cluster including an electronic device according to an embodiment of the disclosure.

FIG. 2 illustrates a neighbor awareness networking (NAN) cluster including an electronic device according to an embodiment of the disclosure.

Referring to FIG. 2, the NAN cluster 200 may include a plurality of electronic devices 101, 201, 202, 203, and/or 204 which support a NAN function. The plurality of electronic devices 101, 201, 202, 203, and/or 204 included in one NAN cluster 200 may use a set of synchronized NAN parameters (e.g. a discovery window (DW) interval, a low-power state interval which is an interval between consecutive discovery windows, a beacon interval, or a NAN channel). The plurality of electronic devices 101, 201, 202, 203, and/or 204 included in the NAN cluster 200 may transmit or receive a multicast/unicast NAN service discovery frame (SDF) to or from each other within a discovery window interval. The plurality of electronic devices 101, 201, 202, 203, and/or 204 may maintain a sleep state in a low-power state interval, and at least one operation of a communication module (e.g. the communication module 190 in FIG. 1) may be limited. The electronic device 101 according to various embodiments may perform a ranging operation with another external electronic device 201 in order to measure the distance to the another external electronic device 201 within the NAN cluster 200 including the electronic device 101.

Figure 3:
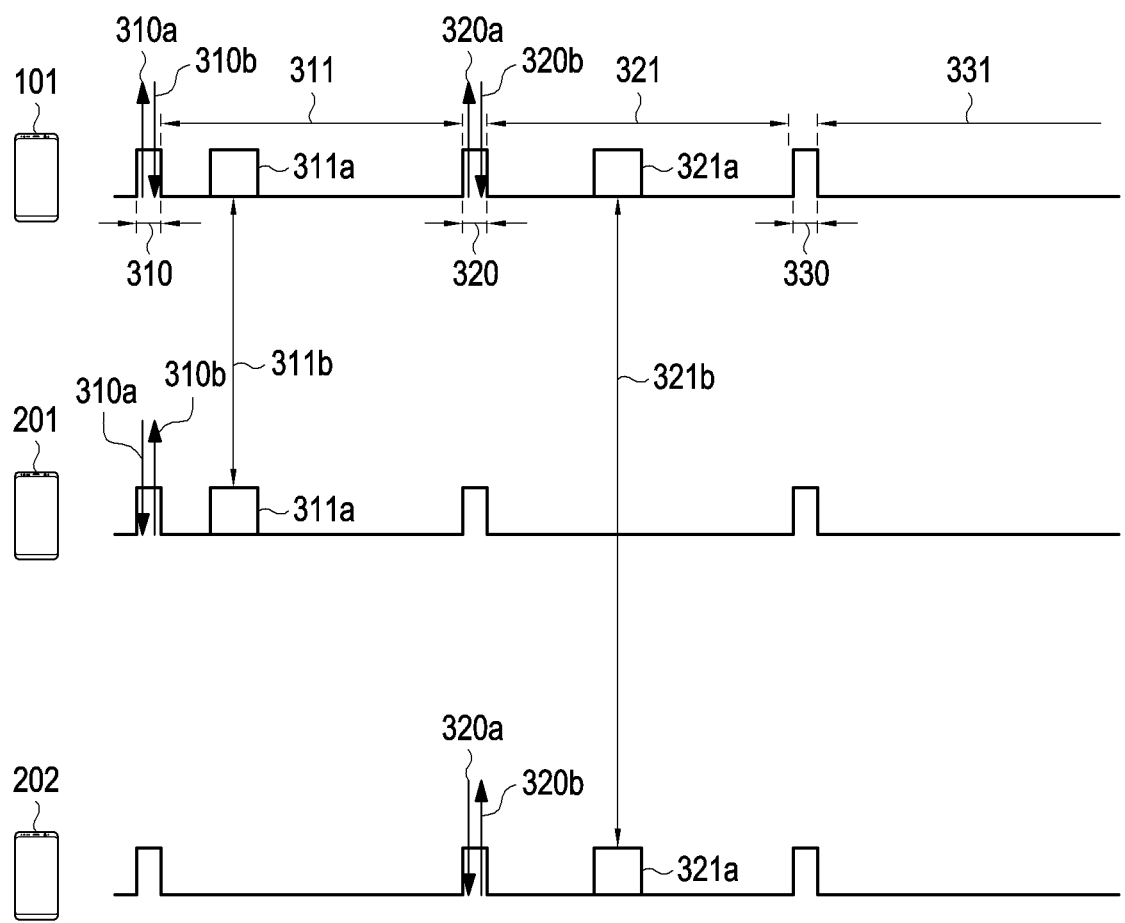
FIG. 3 illustrates an example in which an electronic device performs a ranging operation with an external electronic device in a low-power state interval according to an embodiment of the disclosure.

FIG. 3 illustrates an example in which an electronic device performs a ranging operation with an external electronic device in a low-power state interval according to an embodiment of the disclosure.

Referring to FIG. 3, the electronic device 101 (e.g. the processor 120 in FIG. 1 or the communication module 190 in FIG. 1) according to various embodiments may be synchronized with a first external electronic device 201 and a second external electronic device 202 included in the same NAN cluster (e.g. the NAN cluster 200 in FIG. 2). The electronic device 101, the external electronic device 201, and the second external electronic device 202 included in the same NAN cluster (e.g. the NAN cluster 200 in FIG. 2) may operate based on synchronized discovery window intervals 310, 320, or 330 and synchronized low-power state intervals 311, 321, or 331.

The electronic device 101 (e.g. the processor 120 in FIG. 1) according to various embodiments may perform a ranging preparation operation with the first external electronic device 201 within the first discovery window interval 310 in order to perform a ranging operation 311*b* with the first external electronic device 201. The ranging preparation operation may refer to an operation in which the electronic device 101 identifies an external electronic device capable of a ranging operation and synchronizes frequency information and interval information for performing the ranging operation with the external electronic device. For example, the electronic device 101 may transmit a ranging request message 310a to the first external electronic device 201 within the first discovery window interval 310. The ranging request message 310a may include information for identifying the first external electronic device 201. Based on obtaining the ranging request message 310a, the first external electronic device 201 may transmit a ranging response message 310b corresponding to the ranging request message 310a to the electronic device 101 within the first discovery window interval 310. The ranging request message 310a and the ranging response message 310b may have a NAN action frame form. The ranging request message 310a according to one embodiment may include ranging frequency information and ranging interval information of at least one entry for performing a ranging operation. The ranging interval information may include, for example, information on an interval spaced from the initial discovery window interval, start time information of a ranging interval, and end time information of the ranging interval. The ranging response message 310b according to one embodiment may include information on an entry selected from among the at least one entry.

The electronic device 101 according to various embodiments may perform, based on the ranging preparation operation, the ranging operation 311b with the first external electronic device 201. For example, on the basis of the ranging response message 310b acquired from the first external electronic device 201, the electronic device 101 may perform the ranging operation 311b with the first external electronic device 201 during a ranging interval 311a in a first low-power state interval 311. As at least a part of the ranging operation 311b, the electronic device 101 may perform, based on a fine timing measurement (FTM) protocol according to 802.11 mc, the ranging operation 311b with the first external electronic device 201 by using ranging frequency information and ranging interval information corresponding to entry information included in the ranging response message 310b.

The electronic device 101 (e.g. the processor 120 in FIG. 1) according to various embodiments may perform a ranging preparation operation with the second external electronic device 202 within a second discovery window interval 320 in order to perform a ranging operation 321b with the second external electronic device 202. For example, the electronic device 101 may transmit a ranging request message 320a to the second external electronic device 202 within the second discovery window interval 320. The ranging request message 320a may include information for identifying the second external electronic device 202. Based on obtaining the ranging request message 320a, the second external electronic device 202 may transmit a ranging response message 320b corresponding to the ranging request message 320a to the electronic device 101 within the second discovery window interval 320.

The electronic device 101 according to various embodiments may perform the ranging operation 321b with the second external electronic device 202 on the basis of the ranging preparation operation. For example, the electronic device 101 may perform, based on the ranging response message 320b acquired from the second external electronic device 202, the ranging operation 321b with the second external electronic device 202 during a ranging interval 321a in a second low-power state interval 321. As at least a part of the ranging operation 321b, the electronic device 101 may perform, based on an FTM protocol according to 802.11 mc, the ranging operation 321b with the second external electronic device 202 by using ranging frequency information and ranging interval information corresponding to entry information included in the ranging response message 320b.

According to the ranging method defined in the NAN standard, a low-power state interval (e.g. low-power state interval 311, 321, or 331), which is an interval between consecutive discovery window intervals (e.g. discovery window interval 310, 320, or 330) is 500 milliseconds (ms) and the time required for the electronic device 101 to perform a ranging operation (e.g. operation 311b or 321b) on the basis of the FTM protocol is about 20 ms. Thus, the electronic device 101 may physically perform a ranging operation with many devices within the low-power state interval. However, the discovery window interval (e.g. discovery window interval 310, 320, or 330) is about 16 ms and a ranging preparation operation can be, in general, performed with only one external electronic device 201 or 202 in one discovery window interval (e.g. discovery window interval 310 or 320). As a result, the electronic device 101 must perform a ranging operation (e.g. operation 311b or 312b) with one external electronic device 201 or 202 within the low-power state interval 311 or 321. The embodiments described below are various embodiments which have solved the problem.

Figure 4:
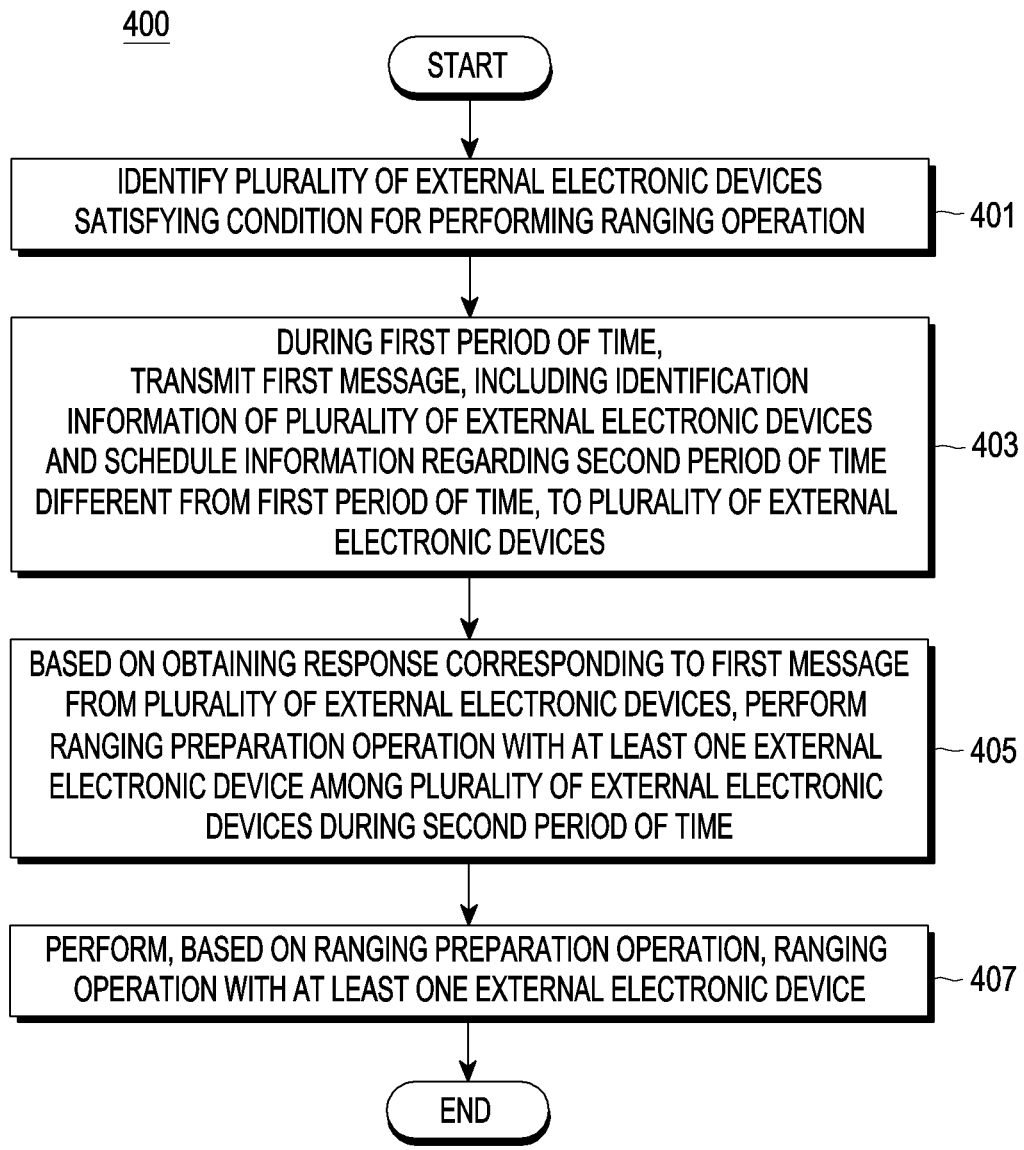
FIG. 4 is a flowchart for illustrating a method allowing an electronic device to perform a ranging preparation operation and a ranging operation with a plurality of external electronic devices in a low-power state interval according to an embodiment of the disclosure.

FIG. 4 is a flowchart for illustrating a method allowing an electronic device to perform a ranging preparation operation and a ranging operation with a plurality of external electronic devices in one low-power state interval according to an embodiment of the disclosure.

Figure 5:
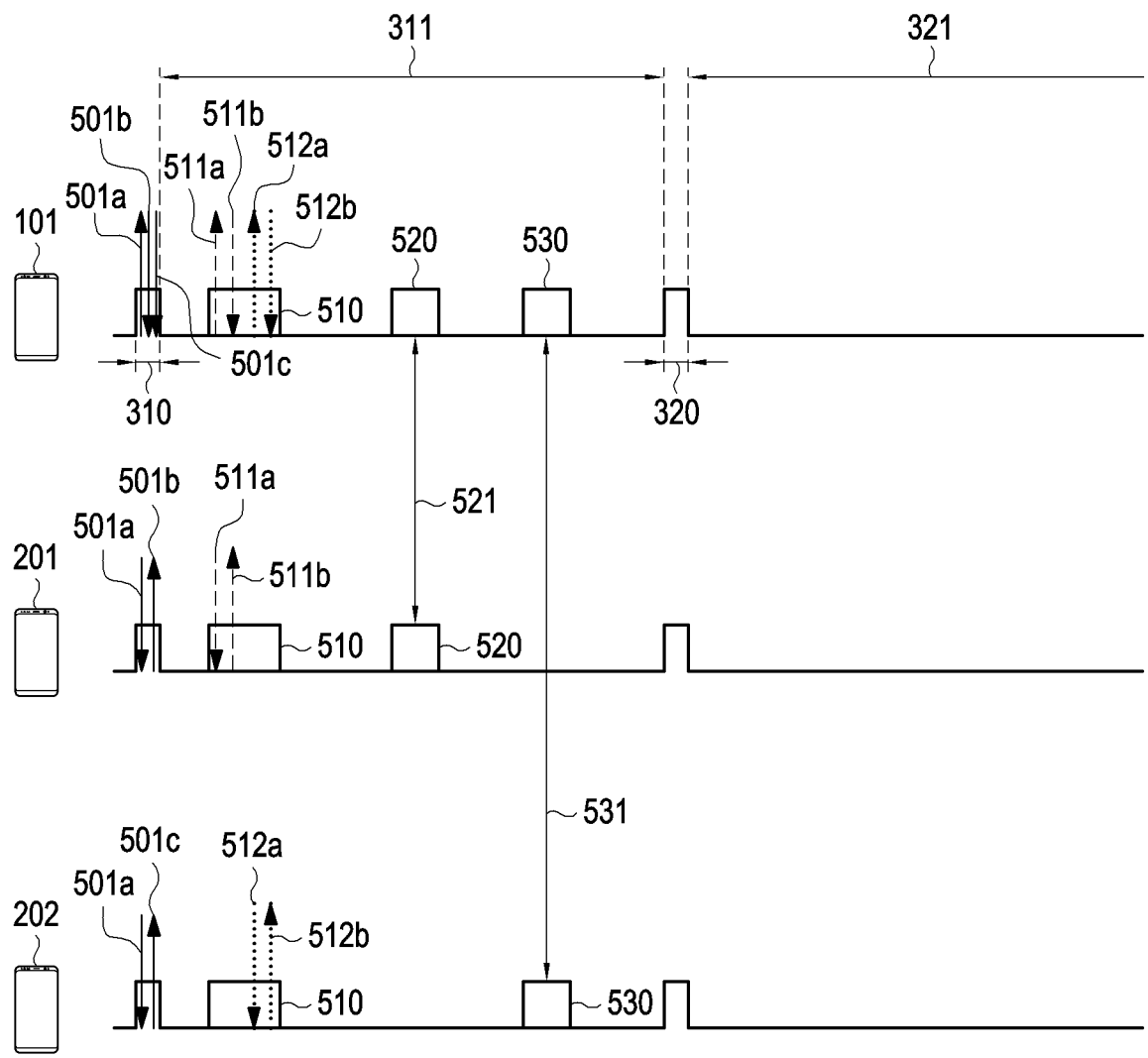
FIG. 5 illustrates an example in which an electronic device performs a ranging preparation operation and a ranging operation with a plurality of external electronic devices in a low-power state interval according to an embodiment of the disclosure.

FIG. 5 illustrates an example in which an electronic device performs a ranging preparation operation and a ranging operation with a plurality of external electronic devices in a low-power state interval according to an embodiment of the disclosure.

Referring to FIG. 4, in operation 401 of flowchart 400, according to various embodiments, the electronic device 101 (e.g. the processor 120 in FIG. 1) may identify a plurality of external electronic devices satisfying a condition for performing a ranging operation within a synchronized NAN cluster (e.g. the NAN cluster 200 in FIG. 2). The electronic device 101 (e.g. the processor 120 in FIG. 1) according to various embodiments may identify multiple external electronic devices which have transmitted information associated with a first application being executed in the electronic device 101 or information associated with a second application corresponding to the first application, and may identify the plurality of external electronic devices satisfying the condition among the multiple external electronic devices. According to one embodiment, the plurality of external electronic devices satisfying a condition for performing a ranging operation may be multiple external electronic devices which have transmitted information associated with a first application being executed in the electronic device 101 or information associated with a second application corresponding to the first application. The second application corresponding to the first application may be, for example, identical to the first application or may be an application which provides the same service (e.g. file share) as that of the first application or is compatible therewith, and the type of the second application is not limited. Information on an application according to one embodiment may include at least one of an application ID of the application or a service ID thereof. For example, the application ID may include information indicating the name of an application, and the service ID may include a hash value of a service name. The information on an application is not limited to the example described above and may include information which can distinguish between applications. According to one embodiment, the plurality of external electronic devices satisfying a condition for performing a ranging operation may be one or more external electronic devices selected by a user. The electronic device 101 (e.g. the processor 120 in FIG. 1) according to various embodiments may identify the multiple external electronic devices within a first period of time, and may identify the plurality of external electronic devices satisfying the condition among the multiple external electronic devices within the first period of time.

Referring to FIG. 5, the first period of time according to one embodiment may include at least a part of a first discovery window interval 310. The first period of time according to one embodiment may include an interval preconfigured by the manufacturer of the electronic device 101 among the low-power state interval 311. A method, in which the electronic device 101 according to various embodiments identifies multiple external electronic devices which have transmitted information associated with a first application being executed in the electronic device 101 or information associated with a second application corresponding to the first application, will be described with reference to FIGS. 6A, 6B, and 7 later. The electronic device 101 (e.g. the processor 120 in FIG. 1) according to various embodiments may perform, based on identifying one external electronic device satisfying a condition for performing a ranging operation, a ranging preparation operation with the identified one external electronic device during the first period of time. On the basis of the ranging preparation operation, the electronic device 101 may perform the ranging operation with the identified external electronic device. For example, on the basis of the fact that an external electronic device satisfying a condition for performing a ranging operation is identified to be one external electronic device (e.g. the first external electronic device 201 in FIG. 3) but not a plurality of external electronic devices, the electronic device 101 may perform a ranging preparation operation with the one external electronic device (e.g. the first external electronic device 201 in FIG. 3) during a discovery window interval (e.g. the first discovery window interval 310 in FIG. 3). The ranging preparation operation may use the ranging preparation operation method described in relation to FIG. 3. The electronic device 101 may perform, based on the ranging preparation operation, a ranging operation with the one external electronic device (e.g. the first external electronic device 201 in FIG. 3). The ranging operation may use the ranging operation method described in relation to FIG. 3.

In operation 403, according to various embodiments, the electronic device 101 (e.g. the processor 120 in FIG. 1) may transmit a first message, including identification information of the plurality of external electronic devices and schedule information regarding a second period of time different from a first period of time, to the plurality of external electronic devices by using the communication module (e.g. the communication module 190 in FIG. 1) during the first period of time. The second period of time according to one embodiment is a ranging preparation interval and may include at least a part of a low-power state interval (e.g. the low-power state interval 311 in FIG. 5).

The identification information of a plurality of external electronic devices according to one embodiment may include a group ID of a group including the plurality of external electronic devices. For example, the identification information may include a group ID of a group including one or more external electronic devices selected by a user. The identification information of a plurality of external electronic devices according to one embodiment may include information associated with a first application being executed in the electronic device 101 and information associated with a second application corresponding to the first application. For example, the identification information may include at least one of an application ID of the second application or a service ID thereof.

The schedule information regarding the second period of time according to one embodiment may include at least one of time information or frequency information of the second period of time required for the electronic device 101 to perform a ranging preparation operation with the plurality of external electronic devices. The information indicating the time of a second period of time may include at least one time offset (e.g. the start time point, the end time point, and the duration of the second period of time) from a predetermined reference (e.g. the start time point or end time point of a discovery window interval), but there is no restriction on the type of the information. The schedule information regarding the second period of time according to one embodiment may include information indicating schedule information pre-stored in each of a plurality of external electronic devices. For example, information indicating schedule information may indicate an action for controlling an external electronic device to wake up during the second period of time, and the type of the information indicating the schedule information may be a string or a value including a predetermined number. The schedule information regarding the second period of time according to one embodiment may be information defined by the electronic device 101. The schedule information regarding the second period of time according to one embodiment may be provided in various forms, and may include, for example, at least one of information indicating time information, frequency information, and schedule information of the second period of time and information defined by the electronic device 101.

Referring to FIG. 5, the first period of time according to one embodiment may include at least a part of the first discovery window interval 310 or may include an interval preconfigured by the manufacturer of the electronic device 101 among the low-power state interval 311. The second period of time according to one embodiment is a ranging preparation operation and may include at least a part of the low-power state interval 311.

The first message according to one embodiment may be a NAN action frame (NAF)-type message or a service discovery frame (SDF)-type message. In order for first message according to one embodiment to include identification information of the plurality of external electronic devices and schedule information regarding the second period of time, separate vendor specific attributes may be defined for a NAF or SDF message. Table 1 shows the format of vendor specific attributes provided in the NAN standard.

TABLE 1

| field | size (octets) | value | description |
| --- | --- | --- | --- |
| attribute ID | 1 | 0xDD | identifies the type of NAN attribute |
| length | 2 | variable | length of the following field in the attribute |
| OUI | 3 | variable | vendor specific OUI |
| body | variable | variable | vendor specific body that is implementation specific |

The schedule information regarding the second period of time according to one embodiment may not only be included in the vendor specific attributes shown in Table 1 but may also be included in the NAN availability attribute predefined in the NAN standard.

The type of the first message according to one embodiment is an SDF type, the first message may use a service descriptor attribute or a service descriptor extension attribute among attributes included in the SDF message, in order to include the identification information of the plurality of external electronic devices and the schedule information regarding the second period of time. Table 2 indicates the format of the service descriptor attribute, and Table 3 indicates the format of the service descriptor extension attribute.

TABLE 2

| field | size (Octets) | value (hex) | description |
|---|---|---|---|
| attribute ID | 1 | 0x03 | identifies the type of NAN attribute |
| length | 2 | variable | length of the following fields in the attribute |
| service ID | 6 | variable | mandatory field that contains the hash of the service name |
| instance ID | 1 | variable | publish_ID or subscribe_ID value of zero is reserved |
| requestor instance ID | 1 | variable | instance ID from the frame that triggered the transmission if available, otherwise set to 0x00 |
| service control | 1 | variable | mandatory field that defines the service control bitmap |
| binding bitmap | 0 or 2 | 0x0000 to 0xFFFF | optional field that indicates the binding of the SDA to post discovery connection attributes |
| matching filter length | 0 or 1 | variable | an optional field and present if a matching service discovery filter is used |
| matching filter | Variable | variable | an optional field that is a sequence of length and value pairs that identify the matching service discovery filters |
| service response filter length | 0 or 1 | variable | an optional field and present if a service response filter is used |
| service response filter | variable | variable | an optional field that identifies the matching service response filters |
| service info length | 0 or 1 | variable | an optional field and present if service specific information is used |
| service info | variable | variable | an optional field that contains the service specific information. Its content may be determined by the application and not specified herein |

TABLE 3

| field | size (Octets) | value (hex) | description |
|---|---|---|---|
| attribute ID | 1 | 0x0E | identifies the type of NAN attribute |
| length | 2 | 0 or 1 | length of the following fields in the attribute. This is an optional field |
| instance ID | 1 | variable | the same value as in the instance ID field of the associated service descriptor attribute |
| control | 2 | variable | information about the fields present |
| range limit | 4 | 0 or 4 | range limit given in centimeters. this is an optional field |
| service update indicator | 1 | 0 or 2 | monotonically increasing value indicating the current version of the service specific information corresponding to the publish instance, which may be conveyed by publish messages and/or FSD messages. this is an optional field |
| service info length | 0 or 2 | variable | length of the service info field. An optional field and present if service info field is present |
| service info | variable | variable | an optional field that contains the service specific information |

Service-info-fields of the above two attributes are fields which can define service specific information, and the corresponding field may include schedule information or action information indicating a schedule. Referring to FIG. 5, the electronic device 101 according to one embodiment is the first external electronic device 201 satisfying a condition for performing a ranging operation or the second external electronic device 202 satisfying the condition, and may transmit a first message 501a that includes a group ID of a group including the first external electronic device 201 and the second external electronic device 202 and schedule information regarding a second period of time 510 (which is a ranging preparation interval) during at least a part of the first discovery window interval 310. The first external electronic device 201 and the second external electronic device 202 according to one embodiment may acquire the first message 501a from the electronic device 101 during a first period of time.

The electronic device 101 (e.g. the processor 120 in FIG. 1) according to various embodiments may acquire a response corresponding to the first message from each of the plurality of external electronic devices during a first period of time. For example, referring to FIG. 5, during at least a part of the first discovery window interval 310, the electronic device 101 may acquire a response 501b corresponding to the first message 501a from the first external electronic device 201 and may acquire a response 501c corresponding to the first message 501a from the second external electronic device 202. The response corresponding to the first message according to one embodiment may include information indicating that a ranging preparation operation can be performed during the second period of time, or may include information indicating that the ranging preparation operation cannot be performed during the second period of time. The response corresponding to the first message according to one embodiment may include schedule information regarding a period of time other than the second period of time among a low-power state interval together with information indicating that a ranging preparation operation cannot be performed during the second period of time.

In operation 405, according to various embodiments, based on obtaining a response corresponding to the first message from the plurality of external electronic devices, the electronic device 101 (e.g. the processor 120 in FIG. 1) may perform a ranging preparation operation with at least one of the plurality of external electronic devices during the second period of time. For example, referring to FIG. 5, based on obtaining the response 501b or 501c corresponding to the first message 501a from the plurality of external electronic devices 201 or 202, the electronic device 101 may perform a ranging preparation operation with at least one of the plurality of external electronic devices 201 and 202 during the second period of time 510. Based on obtaining a response including information indicating that a ranging preparation operation can be performed from at least one of the plurality of external electronic devices, the electronic device 101 (e.g. the processor 120 in FIG. 1) according to various embodiments may perform the ranging preparation operation with the at least one external electronic device during the second period of time. For example, referring to FIG. 5, based on obtaining the response 501b or 501c including information indicating that a ranging preparation operation can be performed from the first external electronic device 201 and the second external electronic device 202, the electronic device 101 may perform the ranging preparation operation with the first external electronic device 201 and the second external electronic device 202 during the second period of time 510.

The electronic device 101 (e.g. the processor 120 in FIG. 1) according to various embodiments may use the schedule information regarding the second period of time to perform a ranging preparation operation with at least one of the plurality of external electronic devices during the second period of time. For example, referring to FIG. 5, the electronic device 101 may perform a ranging preparation operation with the first external electronic device 201 and the second external electronic device 202 during the second period of time 510 by using time information and frequency information of the second period of time 510. As at least a part of performing the ranging preparation operation, the electronic device 101 according to one embodiment may transmit, to at least one external electronic device, a ranging request message including ranging interval information and ranging frequency information corresponding to at least one entry for performing a ranging operation. For example, referring to FIG. 5, the electronic device 101 may transmit, to the first external electronic device 201, a ranging request message 511a including ranging interval information and ranging frequency information corresponding to at least one entry 520 or 530 during the second period of time 510. As at least a part of performing the ranging preparation operation, the electronic device 101 according to one embodiment may acquire, from the at least one external electronic device, a ranging response message including entry information corresponding to the entry selected from among the at least one entry. For example, referring to FIG. 5, the electronic device 101 may acquire a ranging response message 511b including entry information corresponding to the selected entry 520 from the first external electronic device 201 during the second period of time 510. As at least a part of performing a ranging preparation operation, the electronic device 101 according to one embodiment may transmit a ranging request message, which includes ranging interval information and ranging frequency information corresponding to the remaining entries excluding the selected entry among at least one entry, to the remaining external electronic devices excluding the external electronic device having transmitted the ranging response message among at least one device. For example, referring to FIG. 5, the electronic device 101 may transmit a ranging request message 512a, which includes ranging interval information and ranging frequency information corresponding to the remaining entry 530 excluding the selected entry 520, to the second external electronic device 202 excluding the first external electronic device 201 having transmitted the ranging response message 511b. In another example, referring to FIG. 5, the electronic device 101 may acquire a ranging response message 512b including entry information corresponding to the selected entry 530 from the second external electronic device 202 during the second period of time 510. A method allowing the electronic device 101 according to various embodiments to perform the ranging preparation operation with the first external electronic device 201 and the second external electronic device 202 may use the ranging preparation operation performing method described with reference to FIG. 3.

In operation 407, in accordance with various embodiments, the electronic device 101 (e.g. the processor 120 in FIG. 1) may perform, based on the ranging preparation operation, a ranging operation with the at least one external electronic device.

As at least a part of performing the ranging operation, the electronic device 101 according to various embodiments may perform, based on an FTM protocol according to 802.11 mc, a ranging operation with the at least one external electronic device by using ranging frequency information and ranging interval information corresponding to entry information included in a ranging response message. For example, referring to FIG. 5, the electronic device 101 may perform, based on an FTM protocol according to 802.11 mc, the ranging operation 521 with the first external electronic device 201 by using ranging frequency information and ranging interval information corresponding to the information on entry 520 included in the ranging response message 511b. In another example, referring to FIG. 5, the electronic device 101 may perform, based on an FTM protocol according to 802.11 mc, the ranging operation 531 with the second external electronic device 202 by using ranging frequency information and ranging interval information corresponding to the information on entry 530 included in the ranging response message 512b. A method allowing the electronic device 101 according to various embodiments to perform the ranging operation 521 or 531 with the first external electronic device 201 and the second external electronic device 202 may use the ranging operation performing method described with reference to FIG. 3.

Figure 6A:
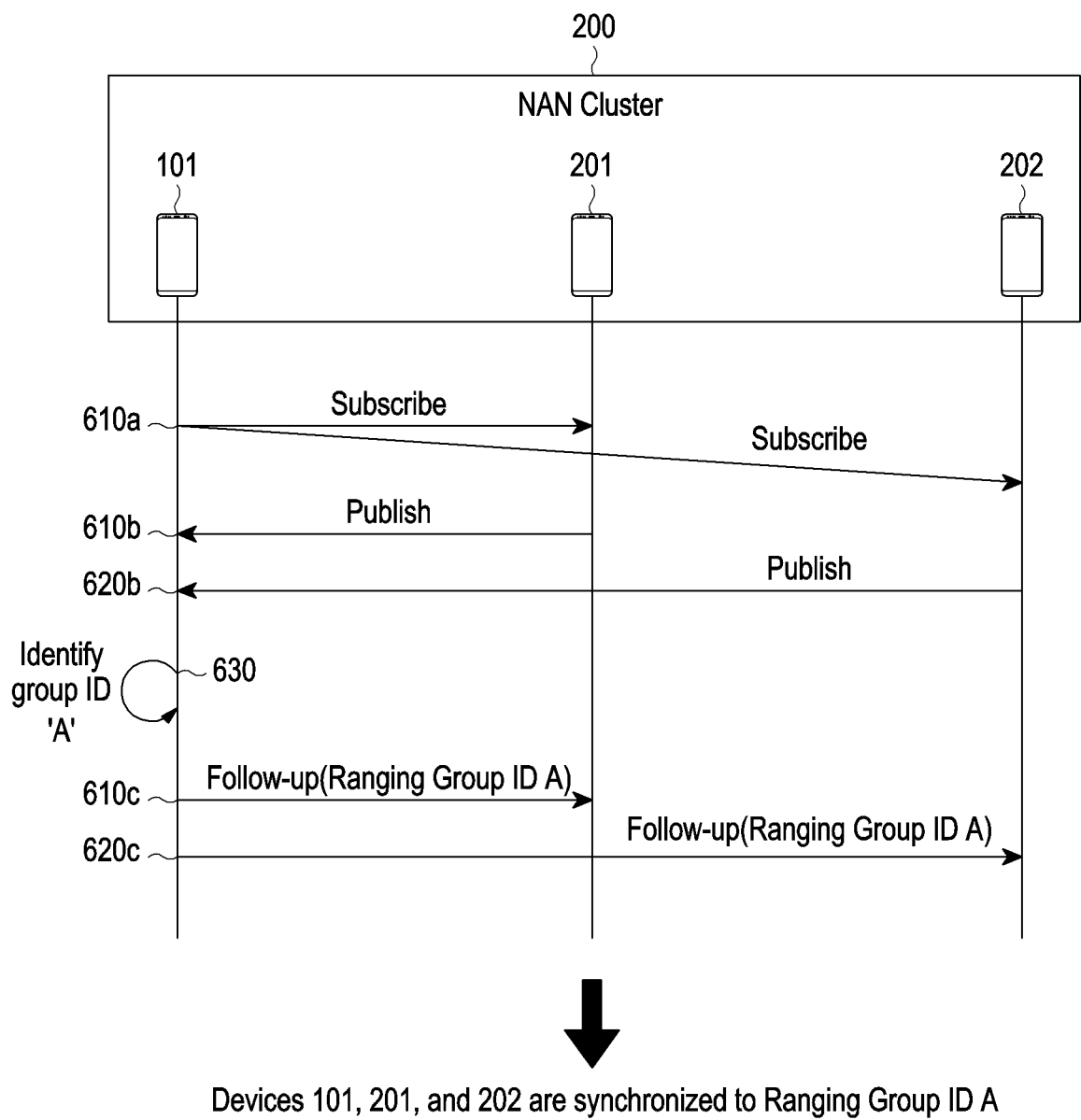
FIG. 6A illustrates an example in which an electronic device identifies a plurality of external electronic devices satisfying a condition for performing a ranging operation and assigns a same group identification (ID) to the plurality of external electronic devices according to an embodiment of the disclosure.

FIG. 6A illustrates an example in which an electronic device identifies a plurality of external electronic devices satisfying a condition for performing a ranging operation and assigns the same group ID to the plurality of external electronic devices according to an embodiment of the disclosure.

Referring to FIG. 6A, the electronic device 101 (e.g. the processor 120 in FIG. 1) according to various embodiments may identify multiple external electronic devices, which have transmitted information associated with a first application being executed in the electronic device 101 or information associated with a second application corresponding to the first application, in order to identify a plurality of external electronic devices satisfying a condition for performing a ranging operation.

The electronic device 101 according to one embodiment may transmit a message including information on the first application being executed in the electronic device 101 to external electronic devices included in the same NAN cluster 200. Information on an application according to one embodiment may include at least one of an application ID or a service ID. For example, referring to FIG. 6A, the electronic device 101 may transmit a subscribe message 610a including a service ID of a first application (e.g. a file share application) being executed in the electronic device 101 to the first external electronic device 201 and the second external electronic device 202 in a broadcast manner. In one embodiment, the electronic device 101 may transmit the subscribe message 610a to the first external electronic device 201 or the second external electronic device 202 in a unicast manner. According to one embodiment, the external electronic device 201 or 202, which has identified that a second application corresponding to the first application is being executed, among the external electronic devices included in the same NAN cluster 200 may transmit a message including information on the second application to the electronic device 101. For example, referring to FIG. 6A, when it is determined that a second application (e.g. a file share application) corresponding to the first application (e.g. a file share application) is being executed, the first external electronic device 201 and the second external electronic device 202 may transmit a publish message 610b or 620b including a service ID of the second application to the electronic device 101 in a unicast manner. The subscribe message or publish message according to one embodiment may have a service discovery frame (SDF) form. The publish message according to one embodiment may include information (e.g. contacts information or account information) associated with a user of an external electronic device (e.g. the first external electronic device 201) transmitting the publish message such that the electronic device 101 can designate a group by using the publish message. The electronic device 101 according to one embodiment may acquire information on the second application from multiple external electronic devices executing the second application among external electronic devices included in the same NAN cluster 200. The second application corresponding to the first application according to one embodiment may be an application identical to the first application, an application compatible with the first application, or an application having an ID identical to the application ID of the first application.

The electronic device 101 (e.g. the processor 120 in FIG. 1) according to various embodiments may identify a plurality of external electronic devices satisfying a condition for performing a ranging operation among multiple external electronic devices which have transmitted information associated with a first application being executed or information associated with a second application corresponding to the first application. According to one embodiment, a plurality of external electronic devices satisfying a condition for performing a ranging operation may be multiple external electronic devices which have transmitted information associated with a first application being executed in the electronic device 101 or information associated with a second application corresponding to the first application. For example, the plurality of external electronic devices satisfying the condition may be all external electronic devices executing a second application identical to a first application being executed in the electronic device 101 among external electronic devices included in the same NAN cluster 200. According to one embodiment, a plurality of external electronic devices satisfying a condition for performing a ranging operation may be one or more external electronic devices selected by a user. For example, the plurality of external electronic devices satisfying the condition may be one or more external electronic devices selected by a user from among multiple external electronic devices identified through a publish message.

The electronic device 101 (e.g. the processor 120 in FIG. 1) according to various embodiments may identify identification information of a plurality of external electronic devices satisfying a condition for performing a ranging operation. The identification information of the plurality of external electronic devices satisfying the condition according to one embodiment may be a group ID of a group including the plurality of external electronic devices. For example, referring to FIG. 6A, the electronic device 101 may identify (630) a group ID (e.g. "A") of a group including the first external electronic device 201 and the second external electronic device 202, which satisfy the condition.

The electronic device 101 (e.g. the processor 120 in FIG. 1) according to various embodiments may generate identification information of a plurality of external electronic devices when identification information of the plurality of external electronic devices is not identified or when it is identified that the identification information of the plurality of external electronic devices has never been transmitted to the plurality of external electronic devices. The electronic device 101 (e.g. the processor 120 in FIG. 1) according to various embodiments may allocate the identification information of the plurality of external electronic devices to each of the plurality of external electronic devices. For example, referring to FIG. 6A, the electronic device 101 may generate a group ID (e.g. "A") when a group ID of a specific group including the first external electronic device 201 and the second external electronic device 202 is not identified or when it is identified that the group ID of the specific group has never been transmitted to the first external electronic device 201 and the second external electronic device 202. The electronic device 101 may transmit follow-up messages 610c and 620c including the group ID (e.g. "A") to the first external electronic device 201 and the second external electronic device 202, respectively. In this instance, the electronic device 101, the first external electronic device 201, and the second external electronic device 202 may be synchronized to the same group ID (e.g. "A"). A method using an SDF-type follow-up message in order to allocate the identification information of the plurality of external electronic devices is merely one example, and the electronic device 101 may allocate the identification information of the plurality of external electronic devices by using an NAF-type message without being constrained by the example. According to one embodiment, the first external electronic device 201 and the second external electronic device 202 may make identification information of a plurality of external electronic devices, acquired from the electronic device 101, and address information (e.g., NAN management interface address) of the electronic device 101 having transmitted the identification information correspond to each other, and may store the identification information and the address information together. The first external electronic device 201 or the second external electronic device 202 according to one embodiment may determine that identification information of a plurality of external electronic devices included in a first message acquired from the electronic device 101 matches identification information stored in the first external electronic device 201 or the second external electronic device 202, and may determine that acquired address information of the electronic device 101 matches stored address information. The first external electronic device 201 or the second external electronic device 202 may perform, based on the determination, a ranging preparation operation according to operation 405 in FIG. 4 with the electronic device 101 during a second period of time.

A subscribe message, a publish message, and a follow-up message according to various embodiments may be transmitted or received within one discovery window interval, or the respective messages may be transmitted or received within different discovery window intervals.

Figure 6B:
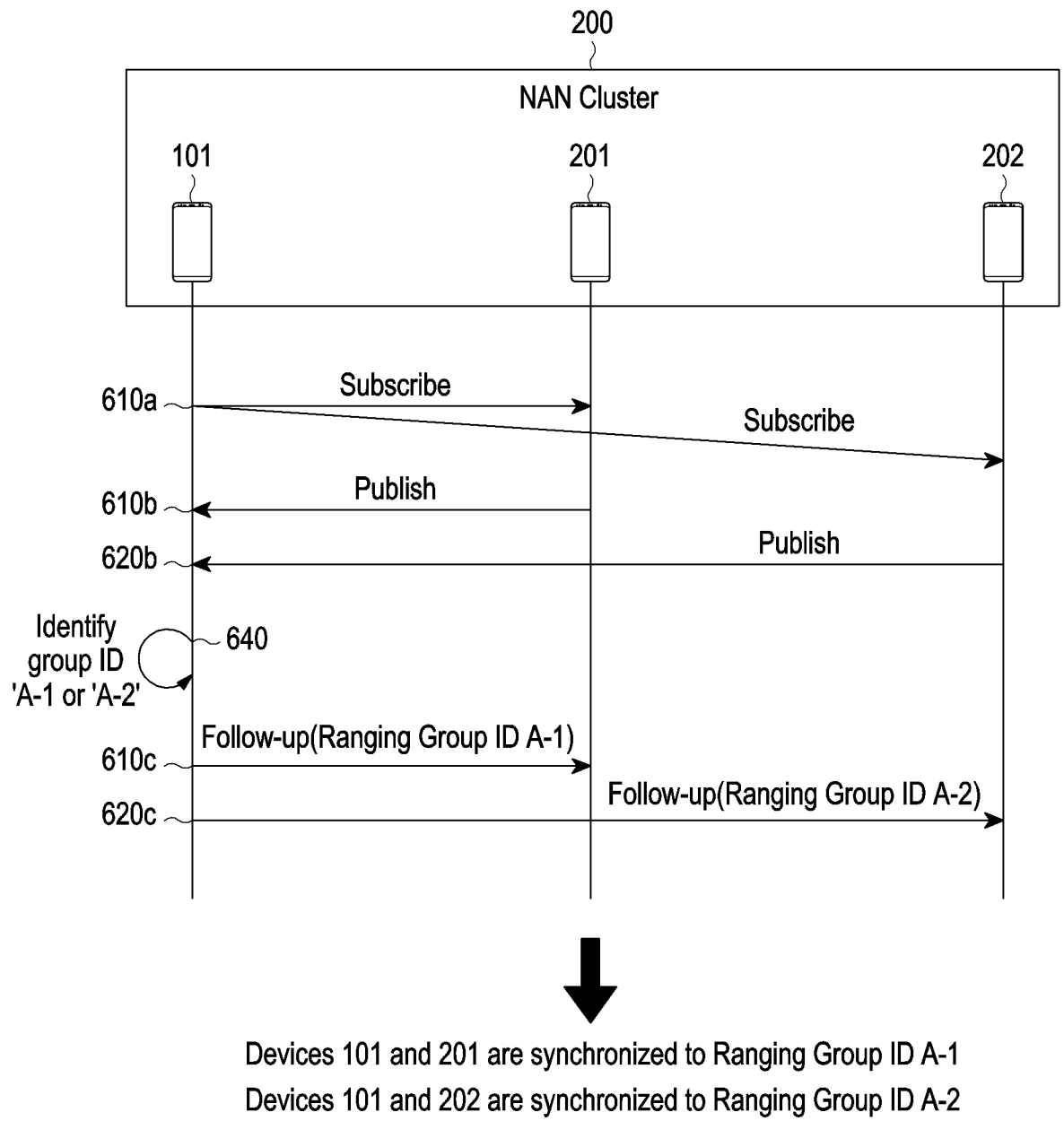
FIG. 6B illustrates an example in which an electronic device identifies a plurality of external electronic devices satisfying a condition for performing a ranging operation and assigns different group IDs to the plurality of external electronic devices according to an embodiment of the disclosure.

FIG. 6B illustrates an example in which an electronic device identifies a plurality of external electronic devices satisfying a condition for performing a ranging operation and assigns different group IDs to the plurality of external electronic devices according to an embodiment of the disclosure.

Referring to FIG. 6B, the electronic device 101 (e.g. the processor 120 in FIG. 1) according to various embodiments may identify multiple external electronic devices, which have transmitted information associated with a first application being executed in the electronic device 101 or information associated with a second application corresponding to the first application, in order to identify a plurality of external electronic devices satisfying a condition for performing a ranging operation. A method for identifying the multiple external electronic devices may use the method described in relation to FIG. 6A.

The electronic device 101 (e.g. the processor 120 in FIG. 1) according to various embodiments may identify the plurality of external electronic devices satisfying the condition for performing a ranging operation from among the multiple external electronic devices which have transmitted the information associated with the first application being executed or the information associated with the second application corresponding to the first application. A method for identifying the plurality of external electronic devices satisfying the condition for performing the ranging operation may use the method described in relation to FIG. 6A.

The electronic device 101 (e.g. the processor 120 in FIG. 1) according to various embodiments may identify at least one additional external electronic device satisfying the condition for performing the ranging operation together with the plurality of external electronic devices. There is a physical limit to the number of external electronic devices with which the electronic device 101 can perform a ranging operation in one low-power state interval. Thus, the electronic device 101 must perform a ranging operation with a designated number of the plurality of external electronic devices in one low-power state interval, and is required to perform a ranging operation with the additional external electronic device in a following low-power state interval. In this instance, the electronic device 101 may distinguish between identification information of the plurality of external electronic devices and identification information of the additional external electronic device so as to perform the ranging operations.

The electronic device 101 (e.g. the processor 120 in FIG. 1) according to various embodiments may identify identification information of a plurality of external electronic devices satisfying a condition for performing a ranging operation and identification information of at least one additional external electronic device satisfying a condition for performing a ranging operation. The identification information of the plurality of external electronic devices satisfying the condition according to one embodiment may be a group ID of a group including the plurality of external electronic devices. For example, referring to FIG. 6B, the electronic device 101 may identify (640) a group ID (e.g. "A-1") of a group including the first external electronic device 201 satisfying the condition. The identification information of the at least one additional external electronic device satisfying the condition according to one embodiment may be a group ID of a group including the at least one additional external electronic device. For example, referring to FIG. 6B, the electronic device 101 may identify (640) a group ID (e.g. "A-2") of a group including the second external electronic device 202 satisfying the condition. When it is determined that the number of the plurality of external electronic devices satisfying the condition and the number of the at least one additional external electronic device satisfying the condition are equal to or greater than a designated number, the electronic device 101 (e.g. the processor 120 in FIG. 1) according to one embodiment may identify identification information of the plurality of external electronic devices and the identification information of the at least one different additional external electronic device.

The electronic device 101 (e.g. the processor 120 in FIG. 1) according to various embodiments may generate identification information of the plurality of external electronic devices and identification information of the at least one additional external electronic device when the identification information of the plurality of external electronic devices is not identified and the identification information of the at least one additional external electronic device is not identified. The electronic device 101 (e.g. the processor 120 in FIG. 1) according to various embodiments may allocate the identification information of the plurality of external electronic devices to each of the plurality of external electronic devices. The electronic device 101 (e.g. the processor 120 in FIG. 1) according to various embodiments may allocate the identification information of the at least one additional external electronic device to each of the at least one additional external electronic device. For example, referring to FIG. 6B, when identification information of the first external electronic device 201 is not identified and identification information of the second external electronic device 202 is not identified, the electronic device 101 may generate a group ID (e.g. "A-1") of a group including the first external electronic device 201 and may generate a group ID (e.g. "A-2") of a group including the second external electronic device 202. The electronic device 101 may transmit the follow-up message 610c including a group ID (e.g. "A-1") to the first external electronic device 201, and may transmit the follow-up message 620c including a group ID (e.g. "A-2") to the second external electronic device 202. In this instance, the electronic device 101 and the first external electronic device 201 may be synchronized to the same group ID (e.g. "A-1"), and the electronic device 101 and the second external electronic device 202 may be synchronized to the same group ID (e.g. "A-2").

The electronic device 101 (e.g. the processor 120 in FIG. 1) according to various embodiments determines that identification information of a plurality of external electronic devices has never been transmitted to the plurality of external electronic devices and determines that identification information of at least one additional external electronic device has never been transmitted to the at least one additional external electronic device, and may generate, based on the above determination, identification information of the plurality of external electronic devices and identification information of the at least one additional external electronic device. The electronic device 101 (e.g. the processor 120 in FIG. 1) according to various embodiments may allocate the identification information of the plurality of external electronic devices to the plurality of external electronic devices, and may allocate the identification information of the at least one additional external electronic device to the at least one additional external electronic device. For example, referring to FIG. 6B, the electronic device 101 determines that a specific group ID has never been transmitted to the first external electronic device 201 and the second external electronic device 202, and may generate, based on the determination, a group ID (e.g. "A-1") of a group including the first external electronic device 201 and may generate a group ID (e.g. "A-2") of a group including the second external electronic device 202. The electronic device 101 may transmit the follow-up message 610c including a group ID (e.g. "A-1") to the first external electronic device 201, and may transmit the follow-up message 620c including a group ID (e.g. "A-2") to the second external electronic device 202. A method using an SDF-type follow-up message in order to allocate the identification information of the plurality of external electronic devices and the identification information of the at least one additional external electronic device is merely one example, and thus the electronic device 101 may allocate the identification information of the plurality of external electronic devices and the identification information of the at least one additional external electronic device by using a NAF-type message without being constrained by the example. The first external electronic device 201 according to one embodiment may make identification information of a plurality of external electronic devices, acquired from the electronic device 101, and address information of the electronic device 101 having transmitted the identification information correspond to each other, and may store the identification information and the address information together. The second external electronic device 202 according to one embodiment may make identification information of at least one additional external electronic device, acquired from the electronic device 101, and address information of the electronic device 101 having transmitted the identification information correspond to each other, and may store the identification information and the address information together. The first external electronic device 201 according to one embodiment determines that identification information of a plurality of external electronic devices included in a message acquired from the electronic device 101 matches identification information stored in the first external electronic device 201, and determines that acquired address information of the electronic device 101 matches stored address information. The first external electronic device 201 may perform, based on the determination, a ranging preparation operation according to operation 405 in FIG. 4 with the electronic device 101 during a second period of time. The second external electronic device 202 according to one embodiment determines that identification information of at least one additional external electronic device included in a message acquired from the electronic device 101 matches identification information stored in the second external electronic device 202, and determines that acquired address information of the electronic device 101 matches stored address information. The second external electronic device 202 may perform, based on the determination, a ranging preparation operation according to operation 911 in FIG. 9 with the electronic device 101.

Figure 7:
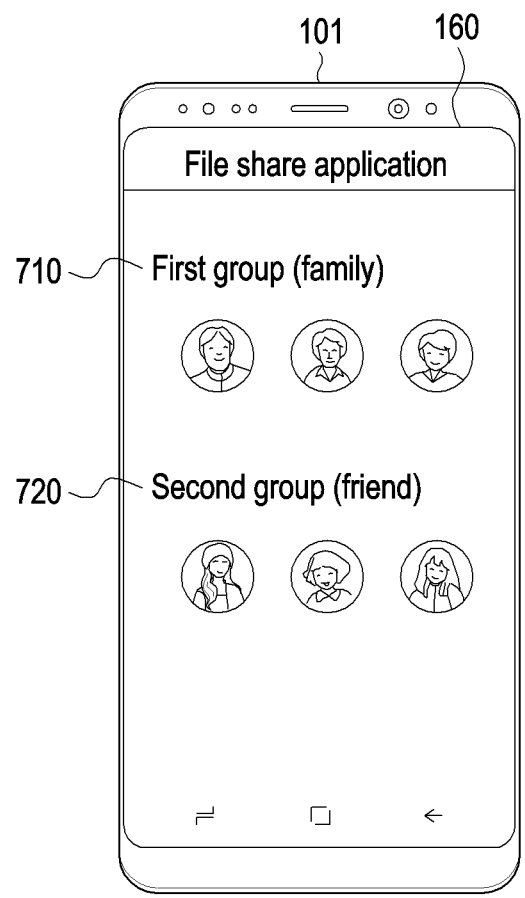
FIG. 7 illustrates an example in which an electronic device identifies one or more external electronic devices selected by a user in order to identify a plurality of external electronic devices satisfying a condition for performing a ranging operation according to an embodiment of the disclosure.

FIG. 7 illustrates an example in which an electronic device identifies one or more external electronic devices selected by a user in order to identify a plurality of external electronic devices satisfying a condition for performing a ranging operation according to an embodiment of the disclosure.

Referring to FIG. 7, the electronic device 101 (e.g. the processor 120 in FIG. 1) according to various embodiments may transmit a message including information on a first application being executed in the electronic device 101 to external electronic devices (e.g. the external electronic devices 201, 202, 203 and/or 204 in FIG. 2) included in the same NAN cluster (e.g. the NAN cluster 200 in FIG. 2) by using the communication module 190. For example, the electronic device 101 may transmit a subscribe message including an application ID of a file share application being executing in the electronic device 101 to external electronic devices included in the same NAN cluster 200.

The electronic device 101 (e.g. the processor 120 in FIG. 1) according to various embodiments may identify multiple external electronic devices, which have transmitted information associated with a first application or information associated with a second application corresponding to the first application, from among external electronic devices (e.g. the external electronic devices 201, 202, 203, and/204 in FIG. 2) included in the same NAN cluster (e.g. the NAN cluster 200 in FIG. 2). For example, the electronic device 101 may acquire a publish message including information on a file share application from multiple external electronic devices executing a file share application among the external electronic devices included in the NAN cluster 200. The electronic device 101 according to one embodiment may display, through the display device 160, the multiple external electronic devices which have transmitted the information associated with the first application or the information associated with the second application corresponding to the first application. For example, the electronic device 101 may display, through the display device 160, users corresponding to external electronic devices executing the file share application.

The electronic device 101 (e.g. the processor 120 in FIG. 1) according to various embodiments may identify one or more external electronic devices selected by a user. For example, when a user of the electronic device 101 desires to share a specific file with a specific person, the electronic device 101 may identify one or more external electronic devices selected by the user from among multiple external electronic devices. In another example, when the one or more external electronic devices are already configured as a specific group (e.g. a first group 710 (e g family) or a second group 720 (e.g. friend)), the electronic device 101 may identify, based on the user's selection of a specific group, the one or more external electronic devices included in the selected group. The electronic device 101 according to one embodiment may provide, based on use record of an application and an external electronic device associated with the application, a group including the external electronic device associated with the application. For example, when it is determined that the user of the electronic device 101 has used an external electronic device A in an application A a designated number of times or more, the electronic device 101 may generate group A including the external electronic device A corresponding to the application A, and may recommend the group A to the user through the display device 160. In another example, when it is determined that the user of the electronic device 101 has used an external electronic device B in an application B different from the application A a designated number of times or more, the electronic device 101 may generate a group B including the external electronic device B corresponding to the application B, and may recommend the group B to the user through the display device 160.

The electronic device 101 (e.g. the processor 120 in FIG. 1) according to various embodiments may identify the one or more external electronic devices selected by the user as a plurality of external electronic devices satisfying a condition for performing a ranging operation. The electronic device 101 may perform a service based on the result of performing the ranging operation. For example, when it is determined that an external electronic device included in a selected group (e.g. the first group 710) is within a designated distance from the electronic device 101, the electronic device 101 may transmit or receive data to or from the external electronic device included in the selected group. When an external electronic device included in an unselected group (e.g. the second group 720) is within a designated distance from the electronic device 101, the electronic device 101 may block transmission or reception of data to or from the external electronic device included in the unselected group, and may thus differentiate whether to provide a service based on the ranging operation result according to each group.

Figure 8:
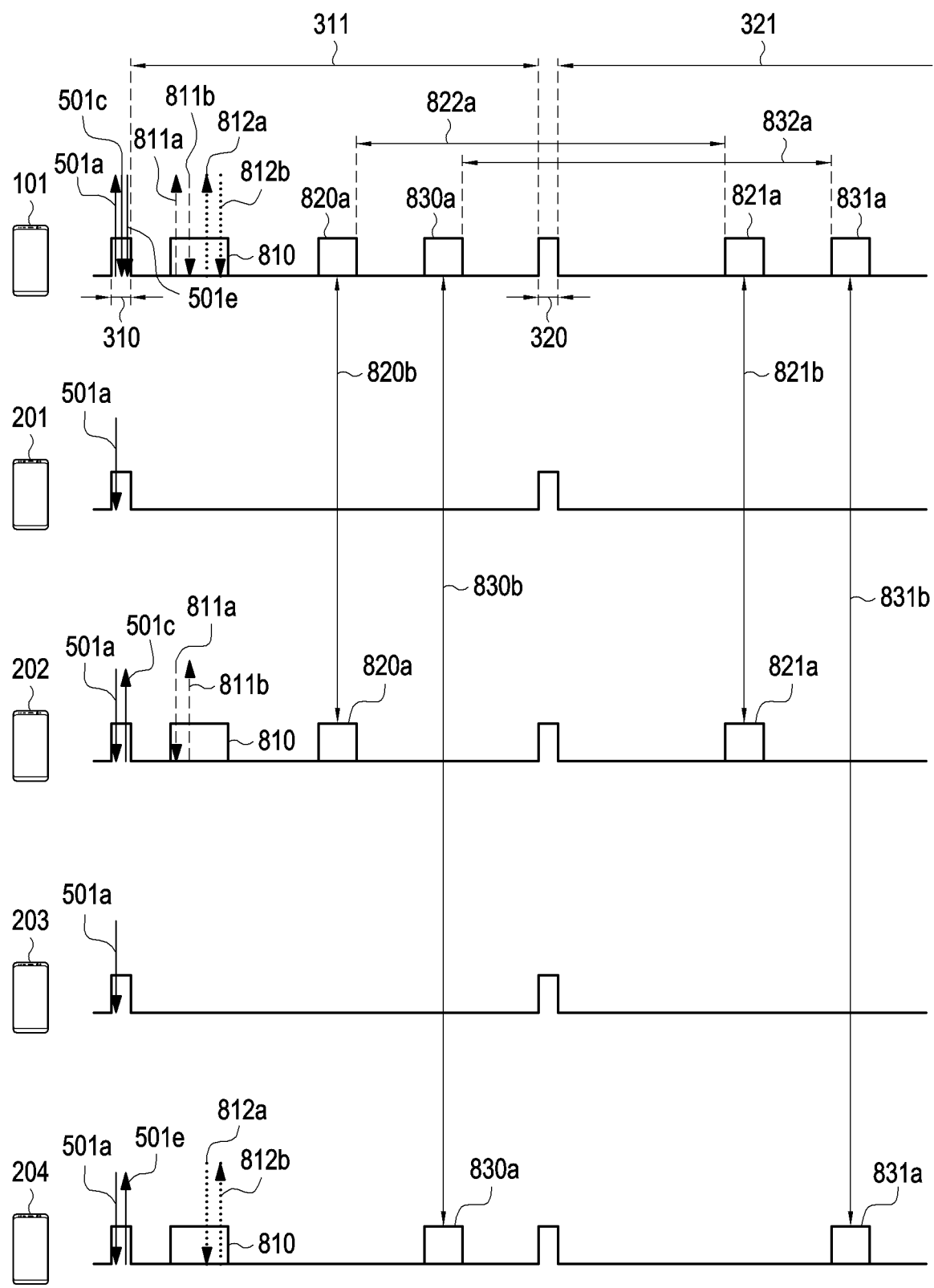
FIG. 8 illustrates an example in which an electronic device performs a ranging operation at a predetermined interval with a plurality of external electronic devices in a plurality of low-power state intervals according to an embodiment of the disclosure.

FIG. 8 illustrates an example in which an electronic device performs a ranging operation at a predetermined interval with a plurality of external electronic devices in a plurality of low-power state intervals according to an embodiment of the disclosure. The electronic device 101, a first external electronic device 201, a second external electronic device 202, a third external electronic device 203, and a fourth external electronic device 204 may be included in a synchronized NAN cluster (e.g. the NAN cluster 200 in FIG. 2).

Referring to FIG. 8, the electronic device 101 (e.g. the processor 120 in FIG. 1) according to various embodiments may identify a plurality of external electronic devices satisfying a condition for performing a ranging operation 820*b*, 830*b*, 821*b*, or 831*b* within a synchronized NAN cluster (e.g. the NAN cluster 200 in FIG. 2). A method for identifying the plurality of external electronic devices may use operation 401 in FIG. 4 or may use the methods described with reference to FIGS. 6A and 6B. For example, the electronic device 101 may identify a plurality of external electronic devices 202 and 204 satisfying a condition for performing a ranging operation from among multiple external electronic devices 201, 202, 203, and 204.

The electronic device 101 (e.g. the processor 120 in FIG. 1) according to various embodiments may transmit a first message 501*a*, including identification information of the plurality of external electronic devices and schedule information regarding a second period of time (e.g. a ranging preparation interval 810) different from a first period of time (e.g. at least a part of a first discovery window interval 310), to the plurality of external electronic devices 202 and 204 during the first period of time by using the communication module 190. A method for transmitting the first message 501*a* may use operation 403 in FIG. 4. For example, the electronic device 101 may transmit a ranging request message (e.g. the first message 501*a*), which includes a group ID of a group including the second external electronic device 202 and the fourth external electronic device 204 and schedule information regarding the ranging preparation interval 810 different from at least a part of the first discovery window interval 310, to the second external electronic device 202 and the fourth external electronic device 204 during the at least a part of the first discovery window interval 310. For example, the first message 501*a* may be transmitted in a broadcasting manner.

The electronic device 101 (e.g. the processor 120 in FIG. 1) according to various embodiments may acquire a response 501*c* and 501*e* corresponding to the first message 501*a* from the plurality of external electronic devices 202 and 204, respectively, during the first period of time (e.g. at least a part of the first discovery window interval 310). For example, referring to FIG. 8, the electronic device 101 may acquire the response 501*c* and 501*e* indicating that a ranging preparation operation can be performed during the ranging preparation interval 810 from each of the second external electronic device 202 and the fourth external electronic device 204, respectively, during the at least a part of the first discovery window interval 310.

The electronic device 101 according to one embodiment may not acquire any response from the first external electronic device 201 and the third external electronic device 203 during at least a part of the first discovery window interval 310. For example, referring to FIG. 8, when it is determined that identification information of the plurality of external electronic devices, included in the acquired first message 501*a*, does not match stored identification information, the first external electronic device 201 and the third external electronic device 203 may not transmit any response corresponding to the first message 501*a*. Thus, the electronic device 101 may not acquire any response from the first external electronic device 201 and the third external electronic device 203.

The electronic device 101 according to one embodiment may acquire a response (not shown), which includes information indicating that a ranging preparation operation cannot be performed during the ranging preparation interval 810, from each of the first external electronic device 201 and the third external electronic device 203 during at least a part of the first discovery window interval 310. For example, when it is determined that identification information of the plurality of external electronic devices, included in the first message 501*a*, does not match stored identification information, each of the first external electronic device 201 and the third external electronic device 203 may transmit a response (not shown), including information indicating that a ranging preparation operation cannot be performed, to the electronic device 101 as a response (not shown) corresponding to the first message 501*a*. Thus, the electronic device 101 may acquire the response (not shown) corresponding to the first message 501*a* from each of the first external electronic device 201 and the third external electronic device 203.

Based on obtaining the response corresponding to the first message from each of the plurality of external electronic devices, the electronic device 101 (e.g. the processor 120 in FIG. 1) according to various embodiments may perform a ranging preparation operation with at least one of the plurality of external electronic devices among the plurality of external electronic devices during the second period of time. For example, based on obtaining the response 501*c* and 501*e* including information indicating that a ranging preparation operation can be performed during the ranging preparation interval 810 from the second external electronic device 202 and the fourth external electronic device 204, the electronic device 101 may perform the ranging preparation operation with the second external electronic device 202 and the fourth external electronic device 204 during the ranging preparation interval 810. As at least a part of performing the ranging preparation operation, the electronic device 101 according to one embodiment may transmit a ranging request message including ranging interval information and ranging frequency information corresponding to at least one entry to the at least one external electronic device so that the external electronic device can select an entry for performing a ranging operation. For example, the electronic device 101 may transmit, to the second external electronic device 202, a ranging request message 811*a* including ranging interval information and ranging frequency information corresponding to each of a first entry 820*a* or 821*a* or a second entry 830*a* or 831*a* so that the second external electronic device 202 selects one among the first entry 820*a* or 821*a* or the second entry 830*a* or 831*a*. In another example, when it is determined through a ranging response message 811*b* that the first entry 820*a* or 821*a* is selected by the second external electronic device 202, the electronic device 101 may transmit, to the fourth external electronic device 204, a ranging request message 812a including ranging interval information and ranging frequency information corresponding to the second entry 830a or 831a.

As at least a part of performing the ranging preparation operation, the electronic device 101 according to one embodiment may transmit, to each external electronic device, a ranging request message including ranging interval information and ranging frequency information corresponding to an entry associated with the external electronic device so that the electronic device 101 can select an entry for performing the ranging operation. For example, the electronic device 101 may transmit, to the second external electronic device 202, the ranging request message 811a including ranging interval information and ranging frequency information corresponding to the first entry 820a or 821a. In another example, the electronic device 101 may transmit, to the fourth external electronic device 204, the ranging request message 812a including ranging interval information and ranging frequency information corresponding to the second entry 830a or 831a. The ranging interval information according to one embodiment may include interval information repeated at a designated period. For example, the ranging interval information of the first entry 820a or 821a and the ranging interval information of the second entry 830a or 831a may include information on period 822a or 832a on an interval repeated at a designated period.

As at least a part of performing a ranging preparation operation, the electronic device 101 according to one embodiment may acquire, from at least one external electronic device, a ranging response message including entry information corresponding to an entry selected from among at least one entry. For example, the electronic device 101 may acquire the ranging response message 811b including entry information corresponding to the first entry 820a or 821a from the second external electronic device 202. In another example, the electronic device 101 may acquire a ranging response message 812b including entry information corresponding to the second entry 830a or 831a from the fourth external electronic device 204. A method in which the electronic device 101 performs the ranging preparation operation with the fourth external electronic device 204 may use the above-described method in which the electronic device 101 performs a ranging preparation operation with the second external electronic device 202.

The electronic device 101 (e.g. the processor 120 in FIG. 1) according to various embodiments may perform, based on the ranging preparation operation, a ranging operation with at least one external electronic device at a designated period. For example, as at least a part of performing a ranging operation, the electronic device 101 may perform, based on an FTM protocol according to 802.11 mc, the ranging operations 820b and 821b with the second external electronic device 202 at a designated period 822a by using ranging interval information and ranging frequency information corresponding to the entry information 820a or 821a included in the ranging response message 811b. In another example, as at least a part of performing a ranging operation, the electronic device 101 may perform, based on an FTM protocol according to 802.11 mc, the ranging operations 830b and 831b with the fourth external electronic device 204 at a designated period 832a by using ranging interval information and ranging frequency information corresponding to the entry information 830a or 831a included in the ranging response message 812b. Referring to FIG. 8, the designated period 822a or 832a according to one embodiment may be information on time from the end time point of a ranging interval corresponding to the entry information 820a or 830a to the time point when a designated interval elapses. The designated period according to one embodiment may be information on time from the start time point of the ranging interval corresponding to the entry information 820a or 830a to the time point when a designated interval elapses. Alternatively, the designated period may be information on time from the start time point or end time point of the first discovery window interval 310 to the time point when a designated interval elapses. Time information on the designated period is not limited to the examples described above and may be variously defined by the electronic device 101 or the external electronic device 201, 202, 203, or 204.

Figure 9:
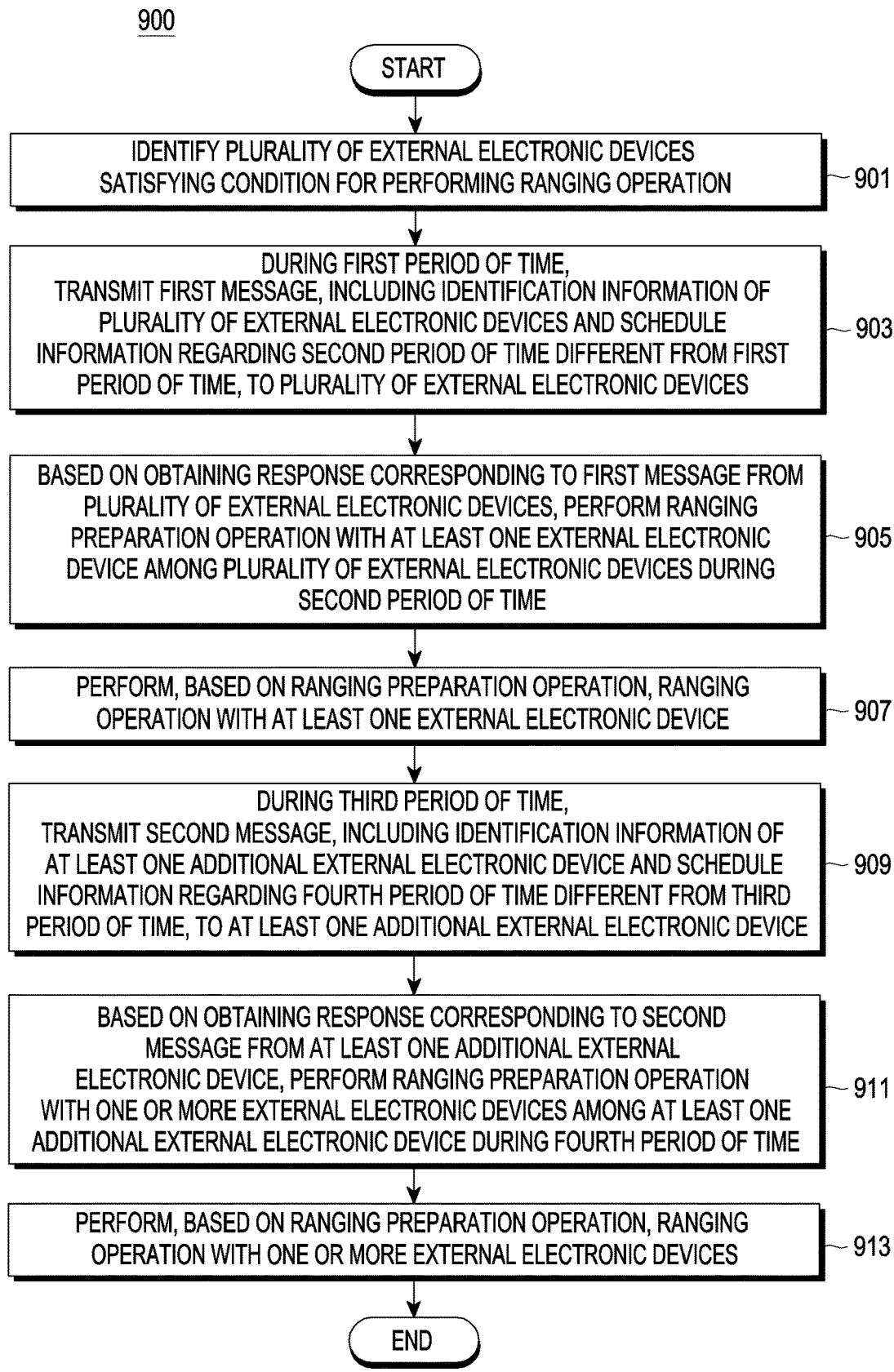
FIG. 9 is a flowchart for illustrating a method allowing an electronic device to perform a ranging operation with a plurality of external electronic devices in a first low-power state interval and perform a ranging operation with at least one additional external electronic device in a second low-power state interval according to an embodiment of the disclosure.

FIG. 9 is a flowchart for illustrating a method allowing an electronic device to perform a ranging operation with a plurality of external electronic devices in a first low-power state interval, and perform a ranging operation with at least one additional external electronic device in a second low-power state interval according to an embodiment of the disclosure.

Figure 10:
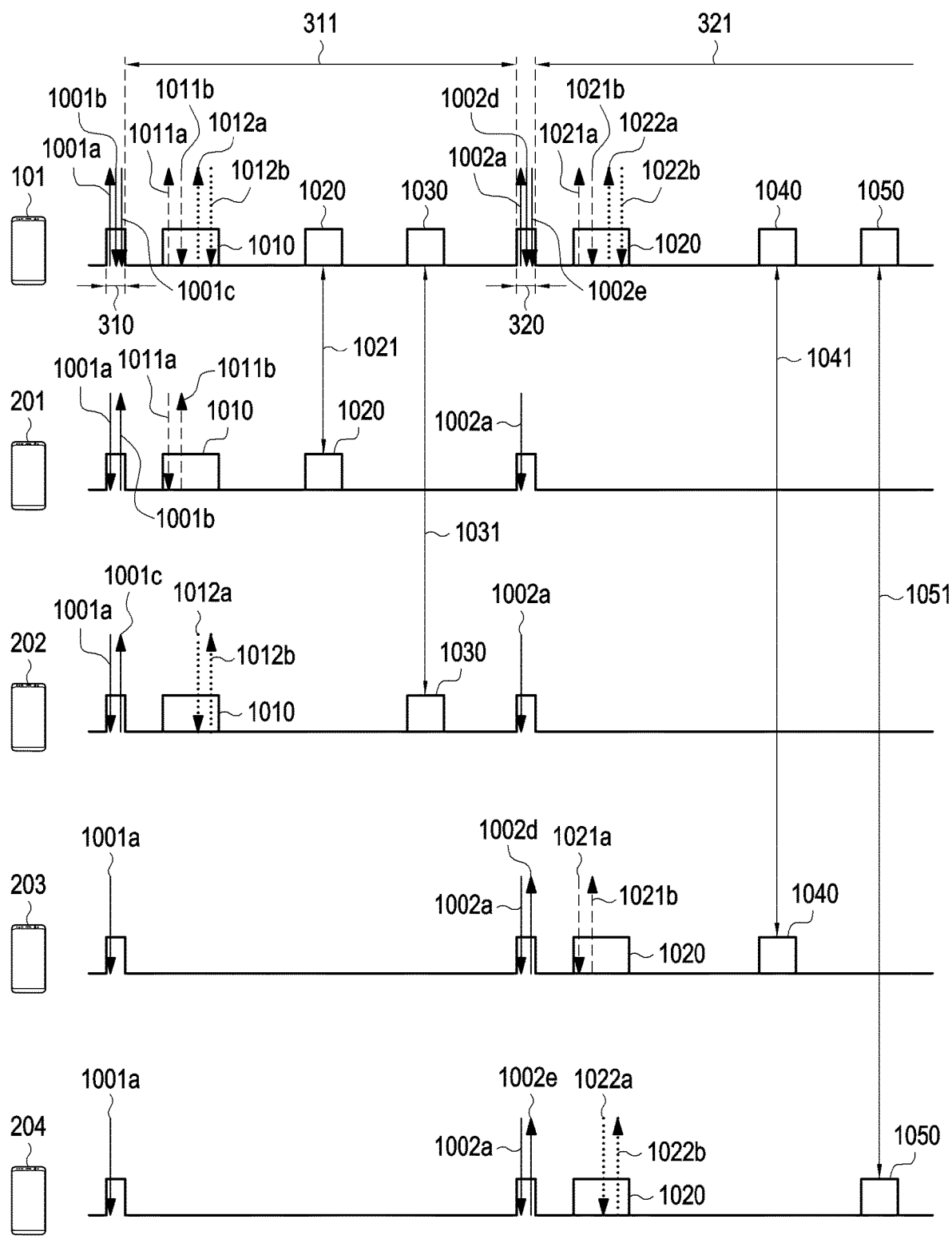
FIG. 10 illustrates an example in which an electronic device performs a ranging operation with a plurality of external electronic devices in a first low-power state interval and performs a ranging operation with at least one additional external electronic device in a second low-power state interval according to an embodiment of the disclosure.

FIG. 10 illustrates an example in which the electronic device performs a ranging operation with a plurality of external electronic devices in a first low-power state interval and performs a ranging operation with at least one additional external electronic device in a second low-power state interval according to an embodiment of the disclosure.

Referring to FIG. 9, in operation 901, the electronic device 101 (e.g. the processor 120 in FIG. 1) according to various embodiments may identify a plurality of external electronic devices (e.g. the external electronic device 201 or 202 in FIG. 10) satisfying a condition for performing a ranging operation. In order to perform operation 901, the electronic device 101 may use operation 401 in FIG. 4 and the method described with reference to FIG. 5.

As at least a part of identifying the plurality of external electronic devices, the electronic device 101 (e.g. the processor 120 in FIG. 1) according to various embodiments may identify at least one additional external electronic device (e.g. the external electronic device 203 or 204 in FIG. 10) satisfying a condition for performing a ranging operation together with the plurality of external electronic devices. In order to identify the at least one additional external electronic device, the electronic device 101 may use the method described with reference to FIG. 6B.

The electronic device 101 (e.g. the processor 120 in FIG. 1) according to various embodiments may classify, based on a designated condition, external electronic devices into a plurality of external electronic devices and at least one additional external electronic device. The electronic device 101 according to one embodiment may classify, based on an operation state of an application, external electronic devices into a plurality of external electronic devices and at least one additional external electronic device. For example, the electronic device 101 may classify, as a plurality of external electronic devices, external electronic devices which have transmitted information associated with a second application corresponding to a first application being executed in the electronic device 101, and may classify external electronic devices other than the plurality of external electronic devices as at least one additional external electronic device. The electronic device 101 according to one embodiment may classify, based on the priority of at least one group with regard to an application, external electronic devices into a plurality of external electronic devices and at least one additional external electronic device. For example, when it is determined that a specific group (e.g. the first group 710 (e.g. family) in FIG. 7) is preferentially designated with regard to a specific application (e.g. a file share application), the electronic device 101 may classify the specific group as a plurality of external electronic devices, and may classify groups (e.g. the second group 720 (e.g. friend) in FIG. 7) other than the specific group as an additional external electronic device. The electronic device 101 according to one embodiment may classify, based on the intensity of a signal acquired from an external electronic device, external electronic devices into a plurality of external electronic devices and at least one additional external electronic device. For example, the electronic device 101 may classify, as a plurality of external electronic devices, external electronic devices having signal intensities equal to or larger than a designated intensity, and may classify, as additional external electronic devices, external electronic devices having signal intensities smaller than the designated intensity.

In operation 903, according to various embodiments, the electronic device 101 (e.g. the processor 120 in FIG. 1) may transmit a first message, including identification information of the plurality of external electronic devices and schedule information regarding a second period of time different from a first period of time, to the plurality of external electronic devices during the first period of time.

In order to perform operation 903, the electronic device 101 may use operation 403 in FIG. 4 and the method described with reference to FIG. 5. For example, referring to FIG. 10, the first message 501a in FIG. 5 may correspond to a first message 1001a in FIG. 10, and the ranging preparation interval (e.g., second period of time 510) in FIG. 5 may correspond to a ranging preparation interval 1010 in FIG. 10. The electronic device 101 according to one embodiment may transmit the first message 1001a, which includes a group ID (e.g. "A-1") of a group including the first external electronic device 201 and the second external electronic device 202 and schedule information regarding the ranging preparation interval 1010, to the first external electronic device 201 satisfying a condition for performing a ranging operation and the second external electronic device 202 satisfying the condition during at least a part of the first discovery window interval 310.

The electronic device 101 (e.g. the processor 120 in FIG. 1) according to one embodiment may acquire a response corresponding to the first message from each of the plurality of external electronic devices during the first period of time. For example, referring to FIG. 10, the electronic device 101 may acquire a response 1001b corresponding to the first message 1001a from the first external electronic device 201 during at least a part of the first discovery window interval 310, and may acquire a response 1001c corresponding to the first message 1001a from the second external electronic device 202. The response 1001b or 1001c corresponding to the first message 1001a may correspond to the response 501c or 501e in FIG. 5.

The electronic device 101 according to one embodiment may not acquire any response from the third external electronic device 203 and the fourth external electronic device 204 during at least a part of the first discovery window interval 310.

Referring to FIG. 10, when it is determined that the identification information of the plurality of external electronic devices, included in the acquired first message 1001a, does not match stored identification information, the third external electronic device 203 and the fourth external electronic device 204 may not transmit any response corresponding to the first message 1001a. Thus, the electronic device 101 may not acquire any response from the third external electronic device 203 and the fourth external electronic device 204.

The electronic device 101 according to one embodiment may acquire a response (not shown), which includes information indicating that a ranging preparation operation cannot be performed during the ranging preparation interval 1010, from each of the third external electronic device 203 and the fourth external electronic device 204 during at least a part of the first discovery window interval 310. For example, when it is determined that the identification information of the plurality of external electronic devices, included in the first message 1001a, does not match stored identification information, each of the third external electronic device 203 and the fourth external electronic device 204 may transmit a response (not shown), which includes information indicating that a ranging preparation operation cannot be performed, to the electronic device 101 as a response (not shown) corresponding to the first message 1001a. Thus, the electronic device 101 may acquire the response (not shown) corresponding to the first message 1001a from each of the third external electronic device 203 and the fourth external electronic device 204.

In operation 905, according to various embodiments, based on obtaining responses corresponding to the first message from the plurality of external electronic devices, the electronic device 101 (e.g. the processor 120 in FIG. 1) according to various embodiments may perform a ranging preparation operation with at least one of the plurality of external electronic devices during the second period of time. In order to perform operation 905, the electronic device 101 may use operation 405 in FIG. 4 and the method described with reference to FIG. 5. For example, referring to FIG. 10, the ranging request message 511a or 512a in FIG. 5 may correspond to a ranging request message 1011a or 1012a in FIG. 10, the ranging response message 511b or 512b in FIG. 5 may correspond to a ranging response message 1011b or 1012b in FIG. 10, and the at least one entry 520 or 530 in FIG. 5 may correspond to at least one entry (e.g., preparation interval) 1020 or 1030 in FIG. 10.

In operation 907, according to various embodiments, the electronic device 101 (e.g. the processor 120 in FIG. 1) may perform, based on the ranging preparation operation, a ranging operation with the at least one external electronic device. In order to perform operation 907, the electronic device 101 may use operation 407 in FIG. 4 and the method described with reference to FIG. 5. For example, referring to FIG. 10, the ranging operation 521 or 531 in FIG. 5 may correspond to the ranging operation 1021 or 1031 in FIG. 10.

In operation 909, according to various embodiments, the electronic device 101 (e.g. the processor 120 in FIG. 1) may transmit a second message, which includes identification information of at least one additional external electronic device and schedule information regarding a fourth period of time different from a third period of time, to the at least one additional external electronic device through a communication module (e.g. the communication module 190 in FIG. 1) during the third period of time. Referring to FIG. 10, the third period of time according to one embodiment may include at least a part of a second discovery window interval 320. The third period of time according to one embodiment may include an interval preconfigured by the manufacturer of the electronic device 101 among a second low-power state interval 321. The fourth period of time according to one embodiment is a ranging preparation interval, and may include at least a part of the second low-power state interval 321.

The identification information of the at least one additional external electronic device according to one embodiment may include a group ID of a group including the at least one additional external electronic device. The identification information of the at least one additional external electronic device according to one embodiment may include information associated with a first application being executed in the electronic device 101 or information associated with a second application corresponding to the first application. The schedule information regarding the fourth period of time according to one embodiment may include at least one among time information and frequency information of the fourth period of time required for the electronic device 101 to perform a ranging preparation operation with the at least one additional external electronic device. The schedule information regarding the fourth period of time according to one embodiment is not limited to the above-described example, and may correspond to the schedule information regarding the second period of time, defined in operation 403 in FIG. 4. The third period of time according to one embodiment may include at least a part of the second discovery window interval 320, or may include an interval preconfigured by the manufacturer of the electronic device 101 among the second low-power state interval 321. The fourth period of time according to one embodiment is a ranging preparation interval, and may include at least a part of the second low-power state interval 321. The second message according to one embodiment may correspond to the first message described in FIG. 4. Referring to FIG. 10, the electronic device 101 according to one embodiment may transmit a second message 1002a, which includes a group ID (e.g. "A-2") of a group including the third external electronic device 203 and the fourth external electronic device 204 and schedule information regarding a ranging preparation interval 1020, to the third external electronic device 203 satisfying a condition for performing a ranging operation and the fourth external electronic device 204 satisfying the condition during at least a part of the second discovery window interval 320. The third external electronic device 203 and the fourth external electronic device 204 according to one embodiment may acquire the second message 1002a from the electronic device 101 during the third period of time.

The electronic device 101 (e.g. the processor 120 in FIG. 1) according to various embodiments may acquire a response corresponding to the second message from each of the at least one additional external electronic device during the third period of time. The response corresponding to the second message according to one embodiment may include information indicating that a ranging preparation operation can be performed during the fourth period of time, or may include information indicating that the ranging preparation operation cannot be performed during the fourth period of time. The response corresponding to the second message according to one embodiment may include schedule information regarding periods of time other than the fourth period of time among a low-power state interval, together with information indicating that the ranging preparation operation cannot be performed during the fourth period of time. For example, referring to FIG. 10, during at least a part of the second discovery window interval 320, the electronic device 101 may acquire a response 1002d corresponding to the second message 1002a from the third external electronic device 203 and may acquire a response 1002e corresponding to the second message 1002a from the fourth external electronic device 204. The response 1002d or 1002e corresponding to the second message 1002a may correspond to the response 501c or 501e in FIG. 5.

The electronic device 101 according to one embodiment may not acquire any response from the first external electronic device 201 and the second external electronic device 202 during at least a part of the second discovery window interval 320. For example, referring to FIG. 10, when it is determined that the identification information of the plurality of external electronic devices, included in the acquired second message 1002a, does not match stored identification information, the first external electronic device 201 and the second external electronic device 202 may not transmit any response corresponding to the second message 1002a. Thus, the electronic device 101 may not acquire any response from the first external electronic device 201 and the second external electronic device 202.

The electronic device 101 according to one embodiment may acquire a response (not shown), which includes information indicating that a ranging preparation operation cannot be performed during the ranging preparation interval 1020, from each of the first external electronic device 201 and the second external electronic device 202 during at least a part of the second discovery window interval 320. For example, when it is determined that the identification information of the plurality of external electronic devices, included in the second message 1002a, does not match stored identification information, each of the first external electronic device 201 and the second external electronic device 202 may transmit a response (not shown), which includes information indicating that a ranging preparation operation cannot be performed, to the electronic device 101 as a response (not shown) corresponding to the second message 1002a. Thus, the electronic device 101 may acquire the response (not shown) corresponding to the second message 1002a from each of the first external electronic device 201 and the second external electronic device 202.

In operation 911, according to various embodiments, based on obtaining the response corresponding to the second message from the at least one additional external electronic device, the electronic device 101 (e.g. the processor 120 in FIG. 1) may perform a ranging preparation operation with one or more external electronic devices among the at least one additional external electronic device during the fourth period of time. Based on obtaining responses including information indicating that the ranging preparation operation can be performed from the one or more external electronic devices among the at least one additional external electronic device, the electronic device 101 (e.g. the processor 120 in FIG. 1) according to various embodiments may perform the ranging preparation operation with the one or more external electronic devices during the fourth period of time.

The electronic device 101 (e.g. the processor 120 in FIG. 1) according to various embodiments may perform the ranging preparation operation with the one or more external electronic devices among the at least one additional external electronic device during the fourth period of time by using the schedule information regarding the fourth period of time. For example, referring to FIG. 10, the electronic device 101 may perform the ranging preparation operation with the third external electronic device 203 and the fourth external electronic device 204 during the fourth period of time 1020 by using time information and frequency information of the fourth period of time 1020. As at least a part of performing the ranging preparation operation, the electronic device 101 according to one embodiment may transmit, to the one or more external electronic devices, a ranging request message including ranging interval information and ranging frequency information corresponding to at least one entry for performing a ranging operation. For example, referring to FIG. 10, the electronic device 101 may transmit a ranging request message 1021*a*, including ranging interval information and ranging frequency information corresponding to at least one entry 1040 or 1050, to the third external electronic device 203 during the fourth period of time 1020. As at least a part of performing the ranging preparation operation, the electronic device 101 according to one embodiment may acquire, from the one or more external electronic devices, a ranging response message including entry information corresponding to an entry selected from among the at least one entry. For example, referring to FIG. 10, the electronic device 101 may acquire a ranging response message 1021*b*, which includes entry information corresponding to the selected entry 1040, from the third external electronic device 203 during the fourth period of time 1020. As at least a part of performing the ranging preparation operation, the electronic device 101 according to one embodiment may transmit a ranging request message, which includes ranging interval information and ranging frequency information corresponding to the remaining entries other than a selected entry among the at least one entry, to the remaining external electronic devices other than an external electronic device having transmitted a ranging response message among the one or more external electronic devices. For example, referring to FIG. 10, the electronic device 101 may transmit a ranging request message 1022*a*, which includes ranging interval information and ranging frequency information corresponding to the entry 1050 other than the selected entry 1040, to the fourth external electronic device 204 other than the third external electronic device 203 which has transmitted the ranging response message 1021*b*. In another example, referring to FIG. 10, the electronic device 101 may acquire a ranging response message 1022*b* including entry information corresponding to the selected entry 1050 from the fourth external electronic device 204 during the fourth period of time 1020. A method for performing the ranging preparation operation with the third external electronic device 203 and the fourth external electronic device 204 by the electronic device 101 according to various embodiments may use the ranging preparation operation performing method described with reference to FIG. 3.

In operation 913, according to various embodiments, the electronic device 101 (e.g. the processor 120 in FIG. 1) may perform, based on the ranging preparation operation, a ranging operation with the one or more external electronic devices.

As at least a part of the ranging operation, the electronic device 101 according to various embodiments may perform, based on an FTM protocol according to 802.11 mc, the ranging operation with the one or more external electronic devices by using ranging interval information and ranging frequency information corresponding to entry information included in a ranging response message. For example, referring to FIG. 10, the electronic device 101 may perform, based on an FTM protocol according to 802.11 mc, the ranging operation 1041 with the third external electronic device 203 by using the ranging interval information and ranging frequency information corresponding to entry information 1040 included in the ranging response message 1021*b*. In another example, referring to FIG. 10, the electronic device 101 may perform, based on an FTM protocol according to 802.11 mc, the ranging operation 1051 with the fourth external electronic device 204 by using the ranging interval information and ranging frequency information corresponding to entry information 1050 included in the ranging response message 1022*b*. A method for performing the ranging preparation operation 1041 and 1051 with the third external electronic device 203 and the fourth external electronic device 204 by the electronic device 101 according to various embodiments may use the ranging operation performing method described with reference to FIG. 3.

Figure 11:
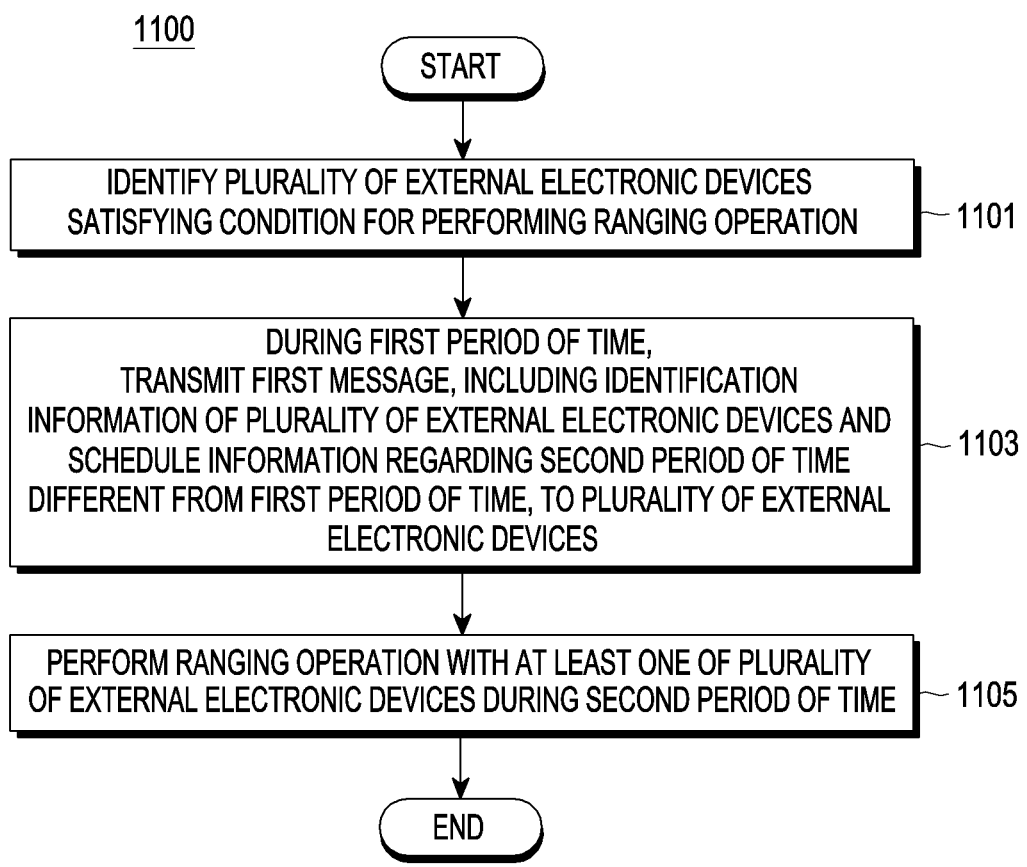
FIG. 11 is a flowchart for illustrating a method allowing an electronic device to perform a ranging preparation operation with a plurality of external electronic devices during a first period of time and perform a ranging operation with the plurality of external electronic devices during a second period of time according to an embodiment of the disclosure.

FIG. 11 is a flowchart for illustrating a method allowing an electronic device to perform a ranging preparation operation with a plurality of external electronic devices during a first period of time and perform a ranging operation with the plurality of external electronic devices during a second period of time according to an embodiment of the disclosure.

Figure 12:
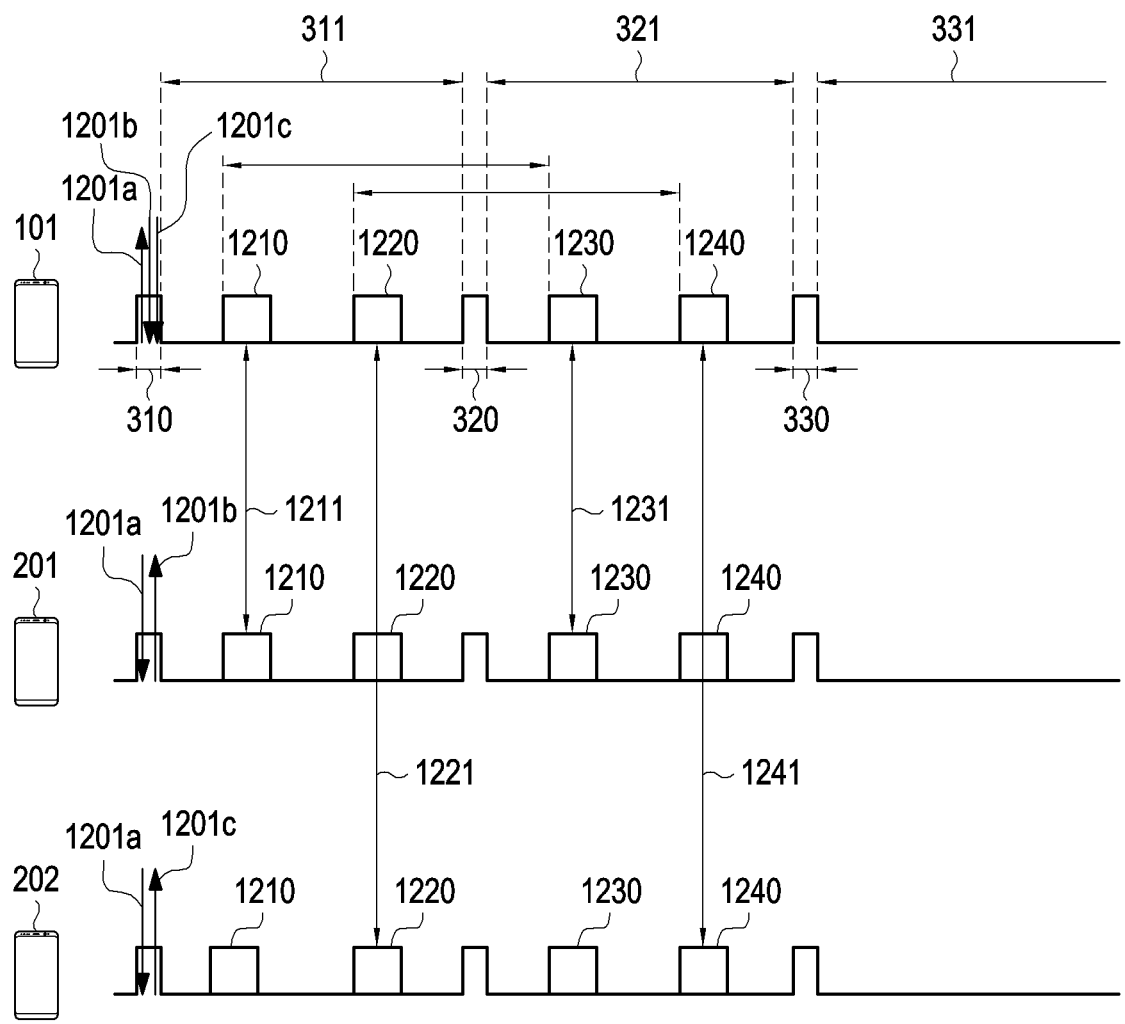
FIG. 12 illustrates an example in which an electronic device performs a ranging preparation operation with a plurality of external electronic devices in one discovery window interval and performs a ranging operation with the plurality of external electronic devices in one low-power state interval according to an embodiment of the disclosure.

FIG. 12 illustrates an example in which an electronic device performs a ranging preparation operation with the plurality of external electronic devices in one discovery window interval and performs ranging operations with a plurality of external electronic devices in low-power state intervals according to an embodiment of the disclosure.

Referring to FIG. 11, in operation 1101 of the flowchart 1100, according to various embodiments, the electronic device 101 (e.g. the processor 120 in FIG. 1) may identify a plurality of external electronic devices (e.g. electronic devices 201 and 202 in FIG. 12) satisfying a condition for performing a ranging operation within a synchronized NAN cluster (e.g. the NAN cluster 200 in FIG. 2). In order to identify the plurality of external electronic devices satisfying the condition, the electronic device 101 may use operation 401 in FIG. 4 and the methods described with reference to FIG. 6A, FIG. 6B, and FIG. 7.

The electronic device 101 (e.g. the processor 120 in FIG. 1) according to various embodiments may transmit a message, which includes information associated with a first application being executed in the electronic device 101, to external electronic devices included in the same NAN cluster (e.g. the NAN cluster 200 in FIG. 2).

Referring to FIG. 12, the electronic device 101 may transmit a subscribe message (not shown), which includes a service ID of a first application (e.g. a file share application) being executed in the electronic device 101, to the first external electronic device 201 and the second external electronic device 202. Multiple external electronic devices, which have determined that a second application corresponding to the first application is being executed, among the external electronic devices included in the same NAN cluster (e.g. the NAN cluster 200 in FIG. 2) according to one embodiment, may transmit a message including information on the second application to the electronic device 101. For example, referring to FIG. 12, when it is determined that the second application (e.g. a file share application) corresponding to the first application (e.g., a file share application) is being executed, the first external electronic device 201 and the second external electronic device 202 may transmit a publish message (not shown) including a service ID of the second application to the electronic device 101. According to one embodiment, each of the multiple external electronic devices having transmitted the information on the second application may transmit, to the electronic device 101, a message including availability information indicating that a ranging operation thereof is possible, and the message including the availability information may be a publish message. For example, referring to FIG. 12, the first external electronic device 201 may transmit, to the electronic device 101, a message including ranging interval information and ranging frequency information corresponding to entries 1210 and 1230 for performing a ranging operation by the first external electronic device 201. In another example, referring to FIG. 12, the second external electronic device 202 may transmit, to the electronic device 101, a message including ranging interval information and ranging frequency information corresponding to entries 1220 and 1240 for performing a ranging operation by the second external electronic device 202, and the message may be a publish message.

In operation 1103, according to various embodiments, the electronic device 101 (e.g. the processor 120 in FIG. 1) may transmit a first message, including identification information of the plurality of external electronic devices and schedule information regarding a second period of time different from a first period of time, to the plurality of external electronic devices through a communication module (e.g. the communication module 190 in FIG. 1) during the first period of time.

The identification information of the plurality of external electronic devices according to one embodiment may include a group ID of a group including the plurality of external electronic devices. The identification information of the plurality of external electronic devices according to one embodiment may include information associated with a first application being executed in the electronic device 101 or information associated with a second application corresponding to the first application. The identification information of the plurality of external electronic devices according to one embodiment may include multiple group IDs or an electronic device ID for distinguishing each of the plurality of external electronic devices. The schedule information regarding the second period of time according to one embodiment may include at least one of time information or frequency information of the second period of time during which the electronic device 101 performs a ranging operation with the plurality of external electronic devices. The schedule information regarding the second period of time according to one embodiment may include time information and frequency information of a period of time during which a ranging operation corresponding to each of the multiple group IDs is performed. The schedule information regarding the second period of time according to one embodiment may include time information and frequency information of a period of time during which a ranging operation corresponding to each of the plurality of external electronic devices is performed. The schedule information regarding the second period of time according to one embodiment may include information indicating schedule information pre-stored in each of the plurality of external electronic devices. For example, the information indicating the schedule information may be information indicating an action which controls an external electronic device to wake up during the second period of time, and the form of the information indicating the schedule information may be a string or a value including a predetermined number. The schedule information regarding the second period of time according to one embodiment may be information defined by the electronic device 101. The first period of time according to one embodiment may include at least a part of the first discovery window interval 310 or may include an interval preconfigured by the manufacturer of the electronic device 101 among the low-power state interval 311. The second period of time according to one embodiment is an interval during which a ranging operation is performed, and may include at least a part of the low-power state interval 311. The first message according to one embodiment may be an NAF-type message or an SDF-type message.

The electronic device 101 (e.g. the processor 120 in FIG. 1) according to various embodiments may identify, based on a publish message acquired from each of the plurality of external electronic devices, the schedule information regarding the second period of time. For example, referring to FIG. 12, the electronic device 101 may acquire, from each of the first external electronic device 201 and the second external electronic device 202, a publish message including the ranging interval information and ranging frequency information corresponding to the entry 1210, 1220, 1230, or 1240 for performing a ranging operation. The electronic device 101 may provide schedule information regarding the second period of time, which includes ranging interval information and ranging frequency information corresponding to some or all of identified entries. Referring to FIG. 12, the electronic device 101 according to one embodiment may transmit a first message 1201a, which includes a group ID of a group including the first external electronic device 201 and the second external electronic device 202 and schedule information regarding the second period of time during which a ranging operation is performed, to the first external electronic device 201 satisfying a condition for performing the ranging operation and the second external electronic device 202 satisfying the condition during the first period of time. The first message 1201a according to one embodiment may be included in a ranging request message and may be an NAF-type or SDF-type message.

In operation 1105, according to various embodiments, based on obtaining responses corresponding to the first message from the plurality of external electronic devices, the electronic device 101 (e.g. the processor 120 in FIG. 1) may perform a ranging operation with at least one of the plurality of external electronic devices during the second period of time.

Based on obtaining a response including information indicating that the ranging operation can be performed from at least one of the plurality of external electronic devices, the electronic device 101 (e.g. the processor 120 in FIG. 1) according to various embodiments may perform the ranging operation with the at least one external electronic device during the second period of time. For example, referring to FIG. 12, when a ranging response message 1201b and 1201c including information indicating that a ranging operation can be performed is respectively acquired from the first external electronic device 201 and the second external electronic device 202, the electronic device 101 may perform the ranging operation 1211, 1221, 1231, or 1241 with the first external electronic device 201 and the second external electronic device 202 during the second period of time 1210, 1220, 1230, or 1240 during which the ranging operation is performed. As at least a part of performing the ranging operation, the electronic device 101 according to one embodiment may perform, based on an FTM protocol according to 802.11 mc, the ranging operation with the at least one external electronic device which has transmitted the response including the information indicating that the ranging operation can be performed.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In accordance with various embodiments, an electronic device 101 includes a communication module 190, a processor 120, and at least one memory 130, wherein the at least one memory 130 may store instructions which instruct, when executed, the processor 120 to: identify a plurality of external electronic devices satisfying a condition for performing a ranging operation; during a first period of time, transmit a first message, including identification information of the plurality of external electronic devices and schedule information regarding a second period of time different from the first period of time, to the plurality of external electronic devices through the communication module; based on obtaining a response corresponding to the first message from the plurality of external electronic devices, perform a ranging preparation operation with at least one external electronic device among the plurality of external electronic devices during the second period of time; and perform, based on the ranging preparation operation, a ranging operation with the at least one external electronic device.

In accordance with various embodiments, the first period of time may include at least a part of a discovery window interval, and the second period of time may include at least a part of a low-power state interval.

In accordance with various embodiments, the identification information of the plurality of external electronic devices may be a group ID of a group including the plurality of external electronic devices.

In accordance with various embodiments, the instructions may instruct the processor 120 to: identify multiple external electronic devices which have transmitted information associated with a first application being executed in the electronic device or information associated with a second application corresponding to the first application; and identify the plurality of external electronic devices satisfying the condition among the multiple external electronic devices.

In accordance with various embodiments, the plurality of external electronic devices satisfying the condition may be external electronic devices which have transmitted a service ID of the first application being executed in the electronic device or a service ID of the second application corresponding to the first application, and the identification information may be the service ID of the first application or the service ID of the second application.

In accordance with various embodiments, the plurality of external electronic devices satisfying the condition may be one or more external electronic devices selected by a user, and the identification information may be a group ID of a group including the one or more external electronic devices selected by the user.

In accordance with various embodiments, the schedule information regarding the second period of time may include at least one of time information or frequency information of the second period of time for performing the ranging preparation operation.

In accordance with various embodiments, the instructions may instruct the processor 120 to perform the ranging preparation operation with the at least one external electronic device, based on obtaining a response including information indicating that the ranging preparation operation is capable of being performed from the at least one external electronic device among the plurality of external electronic devices.

In accordance with various embodiments, the instructions may instruct the processor 120 to perform, based on the ranging preparation operation, the ranging operation with the at least one external electronic device at a designated period.

In accordance with various embodiments, the instructions may instruct the processor 120 to: as at least a part of performing the ranging preparation operation, transmit, to the at least one external electronic device, a ranging request message which includes ranging interval information and ranging frequency information corresponding to at least one entry for performing the ranging operation; and acquire, from the at least one external electronic device, a ranging response message including entry information corresponding to an entry selected from the at least one entry.

In accordance with various embodiments, the instructions may instruct the processor 120 to perform, as at least a part of performing the ranging operation, the ranging operation with the at least one external electronic device by using ranging interval information and ranging frequency information corresponding to the entry information included in the ranging response message, based on a fine timing measurement (FTM) protocol according to 802.11 mc.

In accordance with various embodiments, the instructions may instruct the processor 120 to identify, as at least a part of identifying the plurality of external electronic devices, at least one additional external electronic device satisfying the condition for performing the ranging operation together with the plurality of external electronic devices.

In accordance with various embodiments, the instructions may further instruct the processor 120 to: during a third period of time, transmit a second message, including identification information of the at least one additional external electronic device and schedule information regarding a fourth period of time different from the third period of time, to the at least one additional external electronic device through the communication module 190; perform, based on a response acquired from the at least one additional external electronic device, a first ranging preparation operation with one or more external electronic devices among the at least one additional external electronic device during the fourth period of time; and perform, based on the first ranging preparation operation, a first ranging operation with the one or more external electronic devices.

In accordance with various embodiments, a method for performing a ranging operation may include: identifying a plurality of external electronic devices satisfying a condition for performing a ranging operation; during a first period of time, transmitting a first message, including identification information of the plurality of external electronic devices and schedule information regarding a second period of time different from the first period of time, to the plurality of external electronic devices through a communication module 190; based on obtaining a response corresponding to the first message from the plurality of external electronic devices, performing a ranging preparation operation with at least one external electronic device among the plurality of external electronic devices during the second period of time; and performing, based on the ranging preparation operation, a ranging operation with the at least one external electronic device.

In accordance with various embodiments, the identifying of the plurality of external electronic devices satisfying the condition may include: identifying multiple external electronic devices which have transmitted information associated with a first application being executed in the electronic device or information associated with a second application corresponding to the first application; and identifying the plurality of external electronic devices satisfying the condition among the multiple external electronic devices.

In accordance with various embodiments, the performing of the ranging preparation operation with the at least one external electronic device may include performing the ranging preparation operation with the at least one external electronic device based on obtaining a response including information indicating that the ranging preparation operation can be performed from the at least one external electronic device among the plurality of external electronic devices.

In accordance with various embodiments, the performing of the ranging operation may include performing, based on the ranging preparation operation, the ranging operation with at least one external electronic device at a designated period.

In accordance with various embodiments, the performing of the ranging preparation operation may include: transmitting, to the at least one external electronic device, a ranging request message including ranging interval information and ranging frequency information corresponding to at least one entry for performing the ranging operation; and acquiring, from the at least one external electronic device, a ranging response message including entry information corresponding to an entry selected from the at least one entry.

In accordance with various embodiments, the performing of the ranging operation may include performing, based on a fine timing measurement (FTM) protocol according to 802.11 mc, the ranging operation with the at least one external electronic device by using ranging interval information and ranging frequency information corresponding to the entry information included in the ranging response message.

In accordance with various embodiments, the identifying of the plurality of external electronic devices may include identifying at least one additional external electronic device satisfying the condition for performing the ranging operation together with the plurality of external electronic devices.

In accordance with various embodiments, the method for performing the ranging operation may further include: during a third period of time transmitting a second message, including identification information of the at least one additional external electronic device and schedule information regarding a fourth period of time different from the third period of time, to the at least one additional external electronic device through the communication module 190; performing, based on a response acquired from the at least one additional external electronic device, a first ranging preparation operation with one or more external electronic devices among the at least one additional external electronic device during the fourth period of time; and perform, based on the first ranging preparation operation, a first ranging operation with the one or more external electronic devices.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuitry;
   a processor; and
   at least one memory,
   wherein the at least one memory stores instructions which instruct, when executed, the processor to:
      identify a plurality of external electronic devices satisfying a condition for performing a ranging operation,
      during a first period of time, transmit a first message, comprising identification information of the plurality of external electronic devices and schedule information regarding a second period of time different from the first period of time, to the plurality of external electronic devices through the communication circuitry,
      based on obtaining a response corresponding to the first message from the plurality of external electronic devices, perform a ranging preparation operation with at least one external electronic device among the plurality of external electronic devices during the second period of time, and
      perform, based on the ranging preparation operation, a ranging operation with the at least one external electronic device during a ranging period of time after the second period of time,
      wherein the first period of time comprises at least a part of a discovery window interval,
      wherein the second period of time comprises a first part of a low-power state interval, and
      wherein the ranging period of time comprises a second part of the low-power state interval.

2. The electronic device of claim 1, wherein the identification information of the plurality of external electronic devices is a group ID of a group comprising the plurality of external electronic devices.

3. The electronic device of claim 1, wherein the instructions further instruct the processor to:
   identify multiple external electronic devices which have transmitted information associated with a first application being executed in the electronic device or information associated with a second application corresponding to the first application, and
   identify the plurality of external electronic devices satisfying the condition among the multiple external electronic devices.

4. The electronic device of claim 1,
   wherein the plurality of external electronic devices satisfying the condition are external electronic devices which have transmitted a service ID of a first application being executed in the electronic device or a service ID of a second application corresponding to the first application, and
   wherein the identification information is the service ID of the first application or the service ID of the second application.

5. The electronic device of claim 1,
   wherein the plurality of external electronic devices satisfying the condition are one or more external electronic devices selected by a user, and
   wherein the identification information is a group ID of a group comprising the one or more external electronic devices selected by the user.

6. The electronic device of claim 1, wherein the schedule information regarding the second period of time comprises at least one of time information or frequency information of the second period of time for performing the ranging preparation operation.

7. The electronic device of claim 1, wherein the instructions further instruct the processor to perform the ranging preparation operation with the at least one external electronic device, based on obtaining a response comprising information indicating that the ranging preparation operation is capable of being performed from the at least one external electronic device among the plurality of external electronic devices.

8. The electronic device of claim 1, wherein the instructions further instruct the processor to perform, based on the ranging preparation operation, the ranging operation with the at least one external electronic device at a designated period.

9. The electronic device of claim 1, wherein the instructions further instruct the processor to:
   as at least a part of performing the ranging preparation operation:
      transmit, to the at least one external electronic device, a ranging request message which comprises ranging interval information and ranging frequency information corresponding to at least one entry for performing the ranging operation, and
      acquire, from the at least one external electronic device, a ranging response message comprising entry information corresponding to an entry selected from the at least one entry.

10. The electronic device of claim 9, wherein the instructions further instruct the processor to perform, as at least a part of performing the ranging operation, the ranging operation with the at least one external electronic device by using ranging interval information and ranging frequency information corresponding to the entry information included in the ranging response message, based on a fine timing measurement (FTM) protocol according to 802.11 mc.

11. The electronic device of claim 1, wherein the instructions further instruct the processor to identify, as at least a part of identifying the plurality of external electronic devices, at least one additional external electronic device satisfying the condition for performing the ranging operation together with the plurality of external electronic devices.

12. The electronic device of claim 11, wherein the instructions further instruct the processor to:
   during a third period of time, transmit a second message, comprising identification information of the at least one additional external electronic device and schedule information regarding a fourth period of time different from the third period of time, to the at least one additional external electronic device through the communication circuitry,
   perform, based on a response acquired from the at least one additional external electronic device, a first ranging preparation operation with one or more external electronic devices among the at least one additional external electronic device during the fourth period of time, and perform, based on the first ranging preparation operation, a first ranging operation with the one or more external electronic devices.

13. The electronic device of claim 1, wherein the ranging preparation operation comprises synchronizes frequency information and interval information.

14. A method for performing a ranging operation in an electronic device, comprising:
   identifying a plurality of external electronic devices satisfying a condition for performing a ranging operation;
   during a first period of time, transmitting a first message, comprising identification information of the plurality of external electronic devices and schedule information regarding a second period of time different from the first period of time, to the plurality of external electronic devices through a communication circuitry;
   based on obtaining a response corresponding to the first message from the plurality of external electronic devices, performing a ranging preparation operation with at least one external electronic device among the plurality of external electronic devices during the second period of time; and
   performing, based on the ranging preparation operation, a ranging operation with the at least one external electronic device during a ranging period of time after the second period of time,
   wherein the first period of time comprises at least a part of a discovery window interval,
   wherein the second period of time comprises a first part of a low-power state interval, and
   wherein the ranging period of time comprises a second part of the low-power state interval.

15. The method of claim 14, wherein the identification information of the plurality of external electronic devices is a group ID of a group comprising the plurality of external electronic devices.

16. The method of claim 14, wherein the identifying of the plurality of external electronic devices satisfying the condition comprises:
   identifying multiple external electronic devices which have transmitted information associated with a first application being executed in the electronic device or information associated with a second application corresponding to the first application, and
   identifying the plurality of external electronic devices satisfying the condition among the multiple external electronic devices.

17. The method of claim 14,
   wherein the plurality of external electronic devices satisfying the condition are external electronic devices which have transmitted a service ID of a first application being executed in the electronic device or a service ID of a second application corresponding to the first application, and
   wherein the identification information is the service ID of the first application or the service ID of the second application.

18. The method of claim 14,
   wherein the plurality of external electronic devices satisfying the condition are one or more external electronic devices selected by a user, and
   wherein the identification information is a group ID of a group comprising the one or more external electronic devices selected by the user.

19. The method of claim 14, wherein the schedule information regarding the second period of time comprises at least one of time information or frequency information of the second period of time for performing the ranging preparation operation.

* * * * *